(12) United States Patent
Aluru et al.

(10) Patent No.: US 10,922,898 B2
(45) Date of Patent: Feb. 16, 2021

(54) RESOLVING VIRTUAL APPAREL SIMULATION ERRORS

(71) Applicant: Soul Vision Creations Private Limited, Bangalore (IN)

(72) Inventors: Sravanth Aluru, Bangalore (IN); Sarbartha Sengupta, Bangalore (IN); Gaurav Baid, Bangalore (IN)

(73) Assignee: Soul Vision Creations Private Limited

( * ) Notice: Subject to any disclaimer, the term of this patent is extended or adjusted under 35 U.S.C. 154(b) by 3 days.

(21) Appl. No.: 16/256,815

(22) Filed: Jan. 24, 2019

(65) Prior Publication Data

US 2019/0266794 A1 Aug. 29, 2019

Related U.S. Application Data

(60) Provisional application No. 62/636,157, filed on Feb. 27, 2018.

(51) Int. Cl.
*G06T 19/20* (2011.01)
*G06F 16/54* (2019.01)
(Continued)

(52) U.S. Cl.
CPC .............. *G06T 19/20* (2013.01); *G06F 16/54* (2019.01); *G06F 30/20* (2020.01);
(Continued)

(58) Field of Classification Search
CPC ....... G06T 19/20; G06T 15/005; G06T 15/04; G06T 17/10; G06T 17/20; G06T 2210/16;
(Continued)

(56) References Cited

U.S. PATENT DOCUMENTS 9,754,410 B2 * 9/2017 Hua .......................... A41H 1/02
10,354,453 B2 7/2019 Ngo Ngoc et al.
(Continued)

FOREIGN PATENT DOCUMENTS

CN 107590302 A 1/2018

OTHER PUBLICATIONS

Teschner, Matthias, et al. "Collision detection for deformable objects." Computer graphics forum. vol. 24. No. 1. 9600 Garsington Road, Oxford, OX4 2DQ, UK.: Blackwell Publishing Ltd., 2005. (Year: 2005).*

(Continued)

*Primary Examiner* — Xin Sheng
(74) *Attorney, Agent, or Firm* — Shumaker & Sieffert, P.A.

(57) ABSTRACT

The disclosure describes techniques for apparel simulation. For example, processing circuitry may determine a body construct used for generating a shape of a virtual representation of a user, determine that one or more points on a virtual apparel are within the body construct, and determine, for each of the one or more points, a respective normal vector. Each respective normal vector intersects each respective point and is oriented towards the body construct. The processing circuitry may also extend each of the one or more points to corresponding points on the body construct based on each respective normal vector and generate graphical information of the virtual apparel based on the extension of each of the one or more points to the corresponding points on the body construct.

17 Claims, 12 Drawing Sheets

(51) Int. Cl.
  *G06K 9/00* (2006.01)
  *G06T 15/00* (2011.01)
  *G06T 15/04* (2011.01)
  *G06T 13/40* (2011.01)
  *G06T 17/20* (2006.01)
  *G06Q 30/06* (2012.01)
  *G06T 17/10* (2006.01)
  *G06F 30/20* (2020.01)

(52) U.S. Cl.
  CPC ..... *G06K 9/00275* (2013.01); *G06K 9/00281* (2013.01); *G06Q 30/0627* (2013.01); *G06T 13/40* (2013.01); *G06T 15/005* (2013.01); *G06T 15/04* (2013.01); *G06T 17/10* (2013.01); *G06T 17/20* (2013.01); *G06T 2210/16* (2013.01)

(58) Field of Classification Search
  CPC ......... G06T 13/40; G06F 16/54; G06F 30/20; G06K 9/00275; G06K 9/00281; G06Q 30/0627
  See application file for complete search history.

(56) References Cited

U.S. PATENT DOCUMENTS

2015/0084955 A1    3/2015  Chen et al.
2015/0242546 A1*   8/2015  Jeon ........................ G06F 30/20
                                                       703/2
2019/0139303 A1*   5/2019  Leong .................... G06F 30/20

OTHER PUBLICATIONS

Techie Delight, "Flood Fill Algorithm," accessed from https://www.techiedelight.com/flood-fill-algorithm/, on Aug. 8, 2019, website and article publication on or about 2017, 14 pp.

U.S. Appl. No. 16/204,883, filed Nov. 29, 2018, naming inventors Aluru et al.

International Search Report and Written Opinion from corresponding PCT Application Serial No. PCT/IN2019/050144 dated Jun. 24, 2019 (5 pp).

Adobe Photoshop Help and Tutorials, Feb. 2013 (757 pp).

* cited by examiner

RESOLVING VIRTUAL APPAREL SIMULATION ERRORS

This application claims the benefit of U.S. Provisional Application No. 62/636,157, filed Feb. 27, 2018, the entire contents of which is incorporate herein by reference.

TECHNICAL FIELD

The disclosure relates to computerized virtual representation creation.

BACKGROUND

Online retail and e-commerce are increasingly taking market share from on-premise traditional brick and mortar retailers. When shopping at brick and mortar retailers, a customer can try on apparel and accessories to ensure the right fit and style. When shopping online, a customer is limited in his or her ability to ensure the right fit and style due to the inability to try on the apparel and accessories.

SUMMARY

In general, the disclosure describes example techniques of real-time rendering of virtual representations of a user, e.g., so-called avatars, that can be displayed on a personal computing device. As described in more detail, processing circuitry of one or more network computing devices can generate a virtual apparel and present the virtual representation wearing the apparel.

In some cases, there may be technical problems from the rendering. For example, the virtual apparel may be rendered such that portions of the virtual apparel are rendered within the virtual representation instead of overlaying or being on top of the virtual representation. This disclosure describes techniques to extend the virtual apparel so that the virtual apparel is not rendered within the virtual representation. As described in more detail, processing circuitry may use an iterative process to ensure that points on the virtual apparel are extended to be outside the virtual representation. However, even after extending the points, it is possible that primitives on the virtual apparel would be internal to the virtual representation. For such cases, the processing circuitry may generate repeatedly divide the primitives to sub-primitives and extend out vertices of the sub-primitives until none of the sub-primitives are within the virtual representation. As described in more detail, in this manner, the processing circuitry is capable of preserving the fashion elements of the virtual apparel that may be lost if the virtual apparel were simply extended to be outside of the virtual representation.

In one example, the disclosure describes a method of apparel simulation, the method comprising determining a body construct used for generating a shape of a virtual representation of a user, determining that points on a virtual apparel are within the body construct, determining, for each of the points, a respective normal vector, wherein each respective normal vector intersects each respective point and is oriented towards the body construct, extending each of the points to corresponding points on the body construct based on each respective normal vector, and generating graphical information of the virtual apparel based on the extension of each of the points to the corresponding points on the body construct.

In one example, the disclosure describes a method of apparel simulation, the method comprising determining a body construct used for generating a shape of a virtual representation of a user, determining primitives of a virtual apparel that intersect with primitives of the body construct, dividing the determined primitives of the virtual apparel into a plurality of sub-primitives, determining that a set of one or more of the sub-primitives intersect with one or more primitives of the body construct, based on the determination that the set of one or more of the sub-primitives intersect with one or more primitives of the body construct, further dividing the set of one or more sub-primitives until determined that the further divided sub-primitives do not intersect with the one or more primitives of the body construct, and generating graphical information based at least in part on the further divided sub-primitives.

In one example, the disclosure describes a device for apparel simulation, the device comprising a memory configured to store a virtual representation of a user and processing circuitry. The processing circuitry is configured to determine a body construct used for generating a shape of a virtual representation of a user, determine that points on a virtual apparel are within the body construct, determine, for each of points, a respective normal vector, wherein each respective normal vector intersects each respective point and is oriented towards the body construct, extend each of the points to corresponding points on the body construct based on each respective normal vector, determine primitives of the virtual apparel having the extended points that intersect with primitives of the body construct, divide the determined primitives of the virtual apparel into a plurality of sub-primitives, determine that a set of one or more of the sub-primitives intersect with one or more primitives of the body construct, based on the determination that the set of one or more of the sub-primitives intersect with one or more primitives of the body construct, further divide the second set of one or more sub-primitives until determined that the further divided sub-primitives do not intersect with the one or more primitives of the body construct, and generate graphical information based at least in part on the further divided sub-primitives.

The details of one or more examples are set forth in the accompanying drawings and the description below. Other features, objects, and advantages will be apparent from the description and drawings, and from the claims.

DETAILED DESCRIPTION

Figure 1:
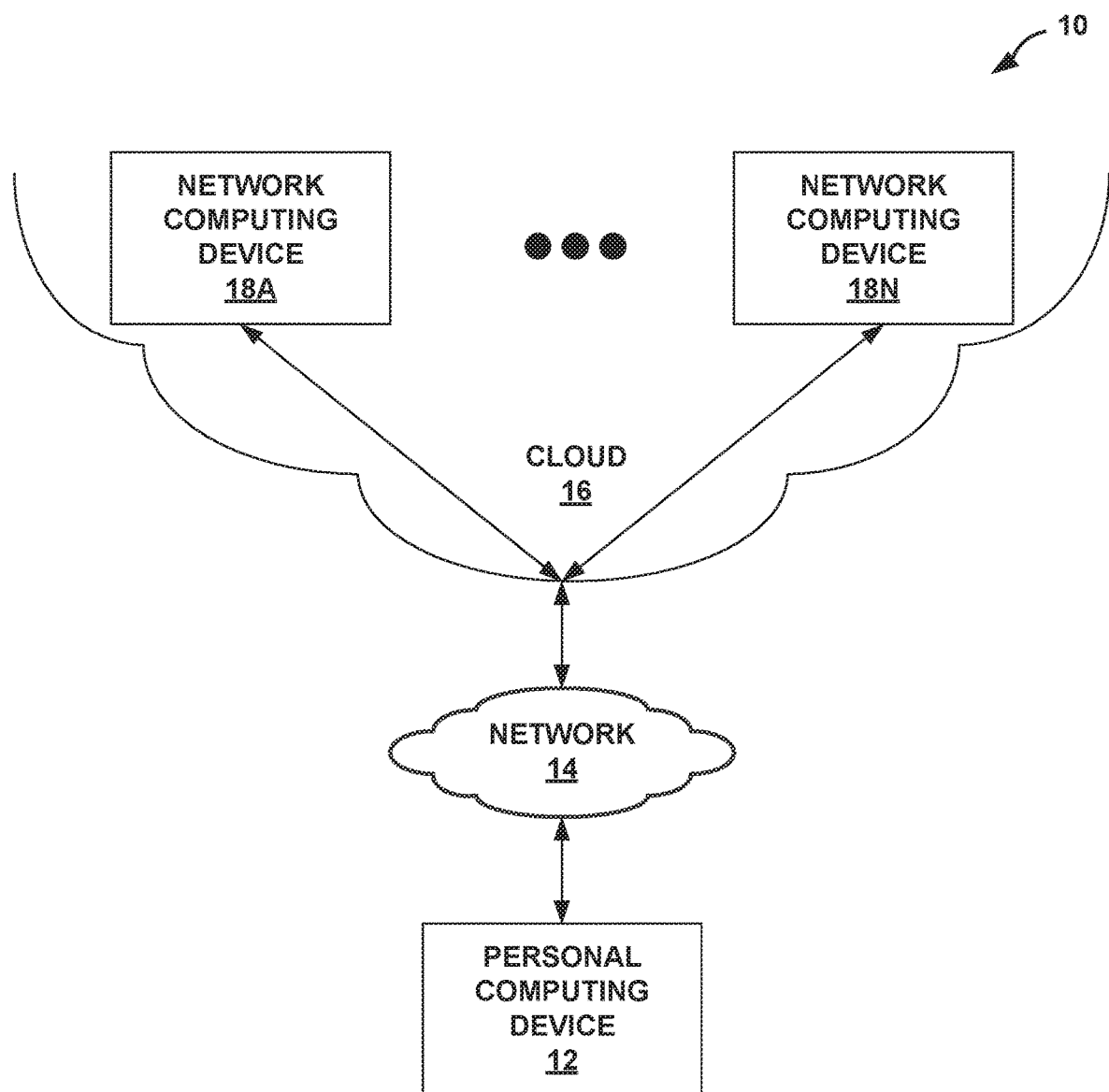
FIG. 1 is a block diagram illustrating a system for creating virtual representations of users in accordance with one or more example techniques described in this disclosure.

Online retail and e-commerce are increasingly taking market share from on premise traditional brick and mortar retailers. However, the online shopping experience, especially in fashion—apparels, accessories, beauty and personal care—has drawbacks compared to an experience in a physical store. In some cases, consumers discover and purchase fashion products online by evaluating static two-dimensional (2D) images of the fashion products on brand ambassadors or models. There is no ability for the customers to try before they buy as in a physical store and nor is the shopping experience personalized to the consumer.

There are some online virtual try-on experiences, but the options are limited. Virtual try-on means a user viewing how a virtual representation of an apparel or accessory would look when worn by the user. Some virtual try-on experiences are not personalized, and the virtualized accessories and apparel cannot be displayed together. These techniques are not well suited for real-time rendering on personal computing devices, such as mobile devices (e.g., smart phones or tablets) or laptops, on which many users view and purchase apparel and accessories.

This disclosure describes example techniques to generate a virtual representation of a user in real-time, as well as virtual representations of apparel and accessories in real-time, so that the user can determine the fit and style of the apparel and accessories. For example, a user may view how the apparel and accessories appear together on his or her body, as opposed to seeing the apparel and accessories separately on bodies that may not accurately reflect the user's body.

As described in more detail below, a user may take a picture of himself or herself (e.g., a "selfie"), and upload the picture to one or more network computing devices (e.g., one or more servers located in a cloud-computing infrastructure coupled to the personal computing device of the user via the Internet). In cloud-computing, operations to be performed in the cloud may be divided or shared across one or more network computing devices. Hence, in this disclosure operations described with respect to a network computing device should be understood to also encompass examples where the operations are shared or divided across multiple network computing devices.

The network computing device may determine facial features in the image. For example, the network computing device may determine key points on the user's face (e.g., locations of cheek bones, nose, eyes, mouth, etc.) and determine relative distances between the key points to determine the facial features. Based on the relative distance, the network computing device may determine deformations to apply to a default deformable 3D face, also called a virtual head representation. The virtual head representation may be a mesh of primitives arranged to appear like a human head. The virtual head representation is "deformable" in the sense that the vertices of the primitives in the mesh can be rearranged to form different head and face shapes.

In some examples, there may be a plurality of virtual head representations. The network computing device may utilize the facial features to select one of the plurality of virtual head representations to deform. As one example, the plurality of virtual head representations may be clustered together based on common features (e.g., virtual head representations having the same eye separation form one cluster, virtual head representations having the same nose to lips distance form one cluster, etc.). Based on the facial features, the network computing device may determine a cluster from the plurality of clusters for the virtual head representations. The network computing device may then select one of the virtual head representations from the determined cluster that most closely matches the head of the user.

In addition, the user may provide body type information (e.g., bust size, waist size, shoulder width, etc.). In some examples, rather than manually entering body type information, the user may upload an image of the his or her body from which the network computing device determines the body type information. Based on the body type information, the network computing device may select a body type from a plurality of body types. The network computing device may render the deformed virtual head representation with the selected body type to create a virtual representation of the user and output graphical information of the virtual representation to the personal computing device of the user for the user to view.

As described in more detail below, a user may also identify a picture or pictures of a piece of apparel and transmit the picture to the one or more network computing devices. The network computing devices store a plurality of meshes and select a mesh from the plurality of meshes based on an analysis of the picture. A mesh generally refers to a virtual 3D structure defined, for example, by a set of data points (e.g., a point cloud) in a virtual 3D space. The network computing devices generate swatches based on the picture and apply the swatches to the mesh to generate a virtual apparel. The swatch may, for example, be a texture image that correspond to a portion of the apparel, such that the virtual apparel is composed of a plurality of swatches. The portion of the apparel may, for example, be defined by a sub group of point clouds. With a virtual representation of the user and a virtual apparel, the network computing device may be able to render the virtual apparel over the virtual representation to give the user a real-life showing of how the apparel will appear on the user.

3D inventories of apparels are generally divided into two components, point clouds (which hold the 3D structure information of the apparels) and the textures. The point clouds define meshes, with a mesh typically varying in size from from 500 KB to 5 MB. A mesh includes the 3D points and connecting edges between those points for defining the 3D structure. A mesh also includes a material file which holds the material properties of the mesh and texture link information for mapping the texture files to the mesh components to generate a final output of a 3D virtual apparel.

By storing a plurality of meshes and selecting a mesh from the plurality of meshes based on an analysis of the picture and by distributing the creation of the virtual apparel across personal computing devices and network computing devices, the example techniques described in this disclosure may provide the technical advantage of reducing computations, relative to other techniques, to ensure real-time virtual apparel creation such that the user can have interactive, real-time user experience.

As described above, in the example techniques, the network computing devices generate a virtual representation of the user and a virtual apparel. In some examples, the network computing devices or a personal computing device may render the virtual apparel on top of the virtual representation of the user so that the user can determine the look and style of the apparel when worn by the user. There may be some potential issues in the rendering. For example, from the results of the rendering, part of the virtual apparel may be incorrectly rendered inside the virtual representation of the user's body.

Moreover, in some examples, the network computing devices may be configured to render the virtual apparel on different body types that are used to generate a virtual representation of the user. For instance, the network computing devices may a priori render the virtual apparel on different body types so that if a particular body type is used to generate the representation of the user, the network computing devices may have already rendered the virtual apparel on that particular body type. However, even in such cases, there may be rendering problems where the virtual apparel is rendered within the body type.

In parts of this disclosure, the term "body construct" is used to generically refer to a construct that is used to determine whether the virtual apparel would be rendered inside the virtual representation of the user. As one example, the body construct may be a construct that forms the virtual representation of the user. As another example, the body construct may be a construct of the body type and an inner layer of another virtual apparel for a priori rendering. In this disclosure, the network computing devices determining a body construct used for generating a shape of a virtual representation of a user is used to mean the determination of a body construct used to determine whether the virtual apparel would be rendered within the area covered by the body construct. For instance, the network computing devices determining a body construct used for generating a shape of a virtual representation of user may be used to mean that the body construct is the construct of the actual virtual representation of the user or the construct of a body type that is used as the body type of the virtual representation of the user.

One way to address the issue of rendering virtual apparel within the virtual representation of the user is to manually check whether the virtual apparel is within the body construct after rendering. Then, a technician or programmer would manually adjust the parameters so that the virtual apparel is not within the body construct. However, such techniques are tedious and may not scale where batch processing (e.g., many renderings) of virtual apparels on body constructs is needed.

In the example techniques described in this disclosure, the network computing devices and/or the personal computing device may determine whether any of the virtual apparel is within the body construct without any or minimal manual intervention. Where the virtual apparel is within the body construct may be considered as holes in the virtual apparel. The examples of the algorithms used in this disclosure may include techniques that determine extend outwards points within the body construct outward and techniques that address edge collision where primitives of the virtual apparel intersect with primitives of the body construct. These example techniques may be applied separately or in combination, and for ease of description these example techniques are described in combination.

The example techniques may be considered as a nested-cage algorithm. In some examples, the algorithm adds one virtual apparel along with the user body into the body construct (e.g., boundary of a trouser along with the body types or the virtual representation of the user) and fixes holes in another virtual apparel in such a way that preserves the fashion aspects of the latter virtual apparel.

As one example, the network computing devices and/or personal computing device may determine which points (e.g., vertices of primitives) of the virtual apparel are within the body construct, and extend those points based on neighboring points that are external to the body construct. However, extending the points based on neighboring points may be insufficient to ensure that the points are actually located outside the body construct. For points that are still within the body construct, the network computing devices and/or personal computing device may determine a normal vector from the point that extends towards the body construct and extend the point along the normal vector until the point is outside the body construct. The normal vector may be orthogonal to a plane formed by the point and neighboring points that from a primitive. This example operation may be considered as point correction algorithm.

After point correction, it is possible that some of the primitives on the virtual apparel intersect with primitives on the body construct (referred to as edge collision). One way to address the edge collision is to extend the primitive to be outside the body construct. However, in such a process the fashion aspects of the virtual apparel are lost because the virtual apparel does not have the correct style and look. As one example, the folds of the virtual apparel may be lost in this process.

In one or more examples, rather than simply extending primitives out of the body construct, the example techniques divide the primitive on the virtual apparel into sub-primitives. The network computing devices and/or personal computing device determine whether points in the sub-primitives are within the body construct, and if so, perform the example techniques of the point correction. The network computing devices and/or personal computing device may also determine whether any of the sub-primitives intersect with the primitives of the body construct, and if so, further divide the sub-primitives. The network computing devices and/or personal computing device may repeat such operations until points are extended out of the body construct and the further divided sub-primitive do not intersect with any of the primitives of the body construct. In this way, by dividing primitives into sub-primitives and extending points of the sub-primitives rather than the entire primitive, the fashion aspects of the virtual apparel are preserved. For example, the vertices of the virtual apparel that form a fold in the virtual apparel would remain compact and together to keep the appearance of the fold in the virtual apparel, rather than the primitives of the fold being pushed out so that no fold is visible.

FIG. 1 is a block diagram illustrating a system 10 for creating virtual representations of users in accordance with one or more example techniques described in this disclosure. As illustrated, system 10 includes personal computing device 12, network 14, and cloud 16. Cloud 16 includes network computing devices 18A-18N (collectively referred to as "network computing devices 18").

Examples of personal computing device 12 include mobile computing devices (e.g., tablets or smartphones), laptop or desktop computers, e-book readers, digital cameras, video gaming devices, and the like. In one or more examples, a user of personal computing device 12 may shop for apparel and accessories online. For example, the user may access online retailers and shift through their items to identify apparel or accessories to purchase. In some examples, the user of personal computing device 12 may be scrolling through content from various websites, and some apparel or accessories may pique his or her interest.

The user may be interested in determining whether to purchase the item or not but may not have access to a retailer where he or she can try on the item for fit and style. In some cases, even where retailer access is available, the user may desire to make more of an on-the-spot determination of whether the item will look good when worn. Moreover, the user may wish to ask friends and family of their opinion and taking everyone to the retailer may not be practical.

In the example techniques described in this disclosure, the user may create a virtual representation of himself or herself via personal computing device 12. The user may use the virtual representation to virtually try-on apparels and accessories to determine whether the style and fit is one he or she would want. The user may also be able to share (e.g., via social media or some other form) the virtual representation with the virtual apparels and accessories with friends and family to solicit opinions.

For determining the style and fit of the apparel and accessories, it may be possible that the user will cycle through many options or try many different combinations. To ensure high quality interaction, the user may desire that the virtual representation is created relatively quickly (e.g., in run-time). As described in more detail, this disclosure describes techniques to create such virtual representations in run-time allowing for the user to quickly view the apparel and accessories.

To create the virtual representation, the user may take an image of himself or herself (e.g., a selfie). The image may include the face of the user and can include other body parts as well. In some examples, rather than taking the image, the user may retrieve a previously stored image. For example, the user may either take a picture using his or her camera or use an already existing picture which has a frontal snapshot of the user's face. This can either be a 2D image, taken from a regular camera on mobile, desktop, etc., or a 3D depth image, taken from a 3D depth sensing camera.

The user may upload the image to one or more network computing devices 18 for further processing. In addition, the user may upload body type information or upload images that show the body to one or more network computing devices 18 for further processing. One or more network computing devices 18 may generate a virtual representation of the user based on the image and the body type information. For example, network computing devices 18 may provide responsive real-time cloud services that can, on a responsive real-time basis, generate custom 3D virtual representations (e.g., avatars) using a 2D frontal face selfie or using a 3D depth camera image of the frontal face along with a few body measurements or full body pictures which can be used to programmatically approximate user body measurements provided by the user.

As illustrated, network computing devices 18 are within cloud 16. Cloud 16 represents a cloud infrastructure that supports multiple network computing devices 18 on which applications or operations requested by one or more users run. For example, cloud 16 provides cloud computing for using network computing devices 18, hosted on network 14, to store, manage, and process data, rather than at personal computing device 12.

Network 14 may transport data between network computing devices 18 of cloud 16 and personal computing device 12. For example, network 14 may form part a packet-based network, such as a local area network, a wide-area network, or a global network such as the Internet. Network 14 may include routers, switches, base stations, or any other equipment that may be useful to facilitate data between personal computing device 12 and network computing devices 18.

Examples of network computing devices 18 include server devices that provide functionality to personal computing device 12. For example, network computing devices 18, in cloud 16, may share data or resources for performing computations for personal computing device 12. As one example, network computing devices 18 may be computing servers, but the example techniques are not so limited. Network computing devices 18 may be a combination of computing servers, web servers, database servers, and the like.

For example, network computing devices 18 may host an application, executing on processing circuitry, via which network computing devices 18 receive the image uploaded by the user and the body type information (e.g., as images or user input). The processing circuitry encompasses the processing circuitry of one or more of network computing devices 18 that together perform the example techniques described in this disclosure. The processing circuitry of network computing devices 18 may determine key features on the face of the user from the image and determine 3D facial shape contours to estimate the face shape and contour of the user.

In addition to the determining a facial estimate, the processing circuitry may be configured to select a body type of the user based on the user provided body type information. Examples of the body type information include height, waist, bust, hip, and/or weight measurements, and/or visual body type selection such as apple, pear, rectangle, etc. These measurements may be adequate from a fit perspective for standard machine-manufactured apparel as the apparel is designed on similar body types. There may be more or fewer examples of body type information that the user provides, and the examples are not limited to the above examples.

In some examples, the processing circuitry may deduce the body type information from full body pictures provided by the user. This may help avoid the user from having to enter measurements. However, as users are likely to wear different sizes of apparels in different pictures (e.g., some loose; some tight fitting), the user may need to provide multiple pictures for the processing circuitry to determine an accurate estimation of user body measurements.

The processing circuitry may use the body type information to select a body type that is the best fit for the user. For example, network computing devices 18 may store information for a plurality of body types (e.g., different shapes and sizes of bodies). The body types that network computing devices store may be virtualized body types. Based on the body type information, the processing circuitry may determine which of the plurality of body types is the closest match.

For example, the processing circuitry may determine the nearest virtual body type match of the body measurements from a database of pre-modelled 3D body avatars without face or neck (e.g., a database of a plurality of virtualized body types). The processing circuitry may match the measurements and anthropometric ratios provided by the user vis-à-vis the measurements and anthropometric ratios of the virtualized body types. By separating out the forming of the face portion of the user from the body creation, the processing circuitry may be configured to generate the graphical representation more quickly than some other techniques to achieve the real-time rendering of the graphical representation.

In one or more examples, the plurality of pre-generated and stored virtualized body types may be pre-generated such that the top of the body types substantially aligns (e.g., such that there is minimal distortion) with the neck seam of the frontal contour before any deformations. To ensure that the alignment between the neck seam of the frontal contour and the top of the plurality of body types persists after deformation of the head portion of the frontal contour, the processing circuitry of one or more network computing devices 18 may not (e.g., may avoid) deforming the neck seam of the frontal contour. Again, the neck seam is at the base of the neck and stops near the beginning of the clavicle. However, the neck seam may include more or less anatomical portions of the body.

By avoiding the deformation of the neck seam, the processing circuitry may ensure that prior to and post deformation of the head portion of the frontal contour, the deformed frontal contour will still substantially align with the selected body type. As the processing circuitry moves up the neck seam along the neck portion of the frontal contour, the processing circuitry may apply deformation to the neck portion of the frontal contour.

With the deformed frontal contour and the selected body type, the processing circuitry of network computing devices 18 may render the deformed frontal contour with the selected body type by aligning the body type with the neck seam of the deformed frontal contour to create the virtual representation of the user. For example, the processing circuitry may determine the vertices of the primitives that form the neck seam on the deformed frontal contour and blend those vertices of the primitives that form the top of the body type to form a unitary structure that is the virtual representation of the user. The processing circuitry may then output graphical information based on the virtual representation of the user to personal computing device 12. Personal computing device 12 may then display the virtual representation of the user.

In some examples, the user, via personal computing device 12, may have selected a virtual apparel that he or she wants to try, and the processing circuitry of network computing devices 18 may render the virtual apparel on top of the virtual representation of the user so that the user can see the style and fit of the apparel. In some examples, personal computing device 12 may be configured to separately receive the virtual representation and the virtual apparel, and personal computing device 12 may render the virtual apparel on the virtual representation.

The processing circuitry of network computing devices 18 can be configured to create 3D apparels from 2D images based on image recognition techniques. The 2D images of the apparels may, for example, be identified by the user via personal computing device 12. Once the user provides the 2D images for the apparel, the processing circuitry of network computing devices 18 may extract information, such as pattern and style level information, and generate meta-tags, using image analysis techniques. The meta-tags may for example store information for categories such as a lower body length, a neckline, a produce color, a product pattern, a skirt shape, a sleeve length, a sleeve style, or other such categories. Each category may have an associated confidence score (e.g., between 0 and 1) indicating a confidence value for the category. The confidence value may be based on machine learning that determines accuracy of the image analysis techniques.

Based on the information in the meta-tags, the processing circuitry of network computing devices 18 associates the apparel with an existing mesh (e.g., a CAD/CAM file) in a database that has stored stitching information for a plurality of meshes. The processing circuitry of network computing devices 18 may then further extract color and print information for various parts of the apparel and prepare those for application onto the identified mesh, e.g., the identified CAD/CAM file. The processing circuitry of network computing devices 18 creates the 3D mesh for the apparel using the existing mesh along with the extracted information out of the 2D images.

The processing circuitry of network computing devices 18 may additionally create one or more textures and apply the textures to the 3D apparel meshes based on image recognition techniques applied to the 2D images provided by the user. A texture may, for example, be a pictorial representation of the cloth used to stitch the apparel. For some apparels, for example a shirt that has a different color or different pattern on the sleeves than on the body, network computing devices 18 may generate more than textures for the 3D apparel mesh. This particular type of texture may be referred to as a recolor texture. Textures may also be used for conveying properties of materials, such as the difference between wool and cotton. A bump-map texture, for example, may be used to give a virtual apparel a feel of a particular cloth type. Other types of textures include specular maps for making the apparel have a certain shininess or highlight and ambient maps for making the apparel have a desired shading or occlusion.

One swatch may have a recolor texture, a bump-map texture, a specular map, etc. all overlaid. Every swatch may must have a recolor texture while the other maps are optional (depending on the property of the swatch). All the maps for a single swatch may be different. The same map (for example a bump map) might be mapped to multiple swatches.

The processing circuitry of network computing devices 18 may identify a texture of an apparel from the 2D image provided and then apply that texture, in the form of color and print for instance, to swatches on the 3D meshes in real-time. When apparel is constructed virtually, the texture swatches are currently created using photo editing tools. The techniques of this disclosure, however, include techniques for creating apparel texture swatches based on image recognition techniques from the 2D image in an automated manner, which may enable the efficient creation of texture swatches and enable easy replication of similar styles of swatches in a scalable manner.

Personal computing device 12 receives a 3D representation of a full stitched garment from the processing circuitry of network computing devices 18. In the 3D representation, all the sub meshes are merged to create the entire apparel. The backend simulation performed by the processing circuitry of network computing devices 18 reads the stitching information which corresponds to the actual stitching that happens during production of the apparel and simulates the garment accordingly. The processing circuitry of network computing devices 18 creates separate material information for each component of the garment. That information is passed to personal computing device 12 through the material file, and each of those materials are assigned to a particular texture. Personal computing device 12 reads the material information from the material file and recolors the textures accordingly to create the new garment from the user image. Material files are created on personal computing device 12 while creating the data file before uploading which helps the renderer to display better details for the SKUs, which helps to ensure the fashion details are present in the renderer.

Personal computing device 12 may render, in real-time, the 3D apparels on the virtual representations of the user, i.e., on customized avatars. This is a process that is not presently available to online fashion consumers. The techniques of this disclosure can bring this functionality to a user in a manner that is highly responsive and completely, or nearly completely, automated.

In addition to apparel, the user may be also be able to select different accessories (e.g., hairstyles, earrings, sunglasses, etc.) and cosmetics (e.g., lipsticks, eye liners, etc.). For example, one a user creates his or her own virtual representation, the user can request to visualize a 3D accessory or cosmetics on the virtual representation. Given the user requests this in real-time basis, the processing circuitry of network computing devices 18 may need to deliver a virtual 3D model for the accessories and cosmetic products in real-time basis.

Moreover, the virtual 3D model of the accessories and cosmetic products can be sized and shaped to properly fit the virtual representation. In one or more examples, network computing devices 18 store the virtual 3D model of the accessories and the cosmetic products as they would appear on the frontal contour, prior to any deformation. The processing circuitry may store information indicative of the deformation applied to the frontal contour. The processing circuitry may determine the deformation to apply to the virtual 3D model of the accessories and cosmetic products based on the information indicative of the deformation applied to the frontal contour so that the virtual 3D model of the accessories and cosmetic products scale with the deformations applied to the frontal contour and the virtual 3D model of the accessories and cosmetic products aligns properly on the virtual representation of the user.

Figure 2:
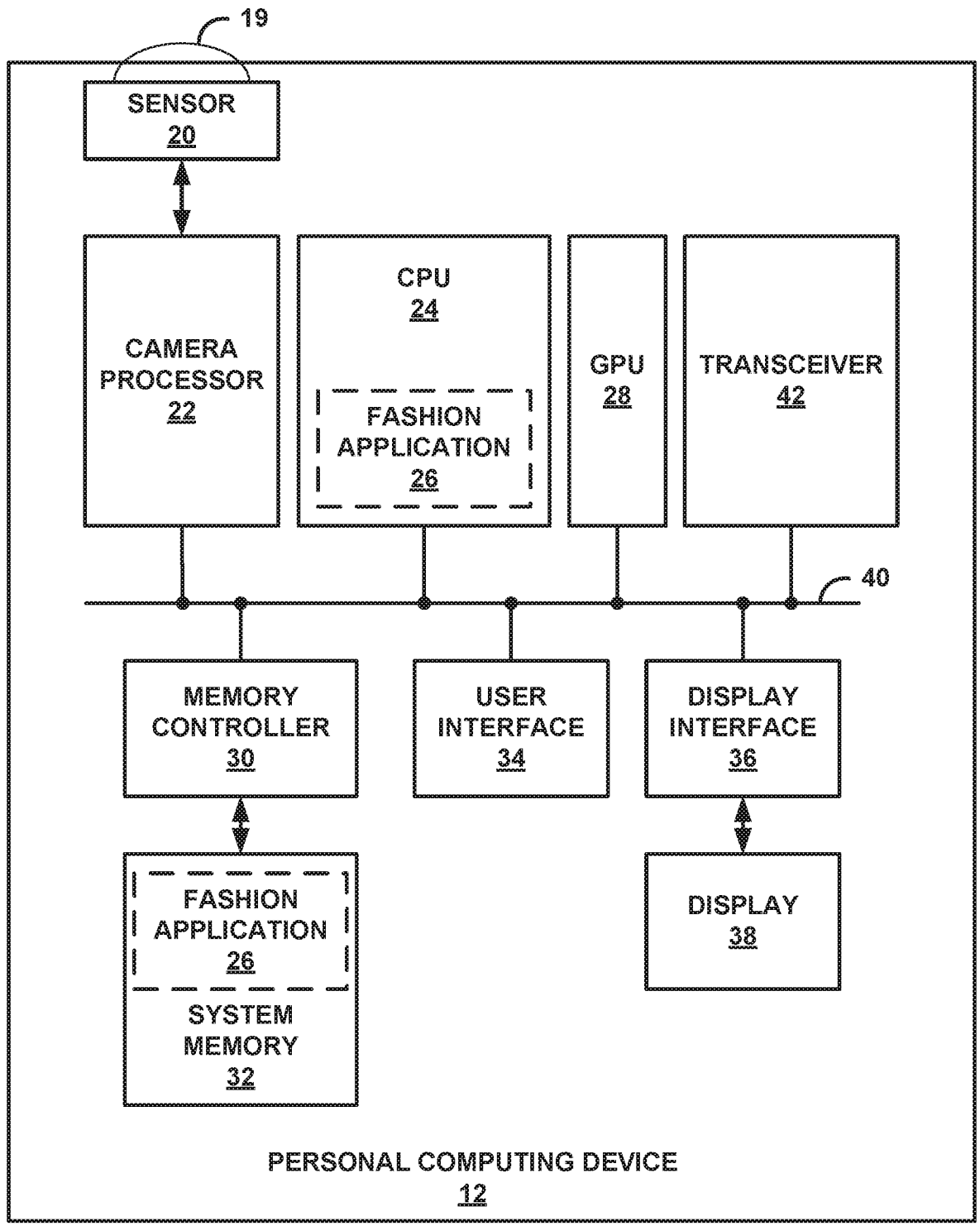
FIG. 2 is a block diagram illustrating an example of a personal computing device configured to display virtual representations of users in accordance with one or more example techniques described in this disclosure.

FIG. 2 is a block diagram illustrating an example of a personal computing device configured to display virtual representations of users in accordance with one or more example techniques described in this disclosure. Examples of personal computing device 12 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA). Additional examples of person computing device 12 include a personal music player, a video player, a display device, a camera, a television, or any other type of device that processes and/or displays graphical data.

As illustrated in the example of FIG. 2, personal computing device 12 includes first lens 20, camera processor 22, a central processing unit (CPU) 24, a graphical processing unit (GPU) 28, memory controller 30 that provides access to system memory 32, user interface 34, and display interface 36 that outputs signals that cause graphical data to be displayed on display 38. Personal computing device 12 also includes transceiver 42, which may include wired or wireless communication links, to communicate with network 14 of FIG. 1. Although FIG. 2 illustrates lens 20 as part of the same device that includes GPU 28, the techniques described in this disclosure are not so limited.

Also, although the various components are illustrated as separate components, in some examples the components may be combined to form a system on chip (SoC). As an example, camera processor 22, CPU 24, GPU 28, and display interface 36 may be formed on a common integrated circuit (IC) chip. In some examples, one or more of camera processor 22, CPU 24, GPU 28, and display interface 36 may be in separate IC chips. Various other permutations and combinations are possible, and the techniques should not be considered limited to the example illustrated in FIG. 2. The various components illustrated in FIG. 2 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry.

The various units illustrated in FIG. 2 communicate with each other using bus 40. Bus 40 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 2 is merely exemplary, and other configurations of computing devices and/or other image processing systems with the same or different components may be used to implement the techniques of this disclosure.

Camera processor 22 is configured to receive the electrical currents as sensor signals from respective pixels of sensor 20 and process the electrical currents to generate pixel data of images. In some examples, camera processor 14 may be configured as a single-input-multiple-data (SIMD) architecture. Camera processor 14 may perform the same operations on current received from each of the pixels on sensor 20. Each lane of the SIMD architecture may include an image pipeline. The image pipeline includes hardwire circuitry and/or programmable circuitry (e.g., at least one of fixed-function or programmable circuitry) to process the output of the pixels.

Camera processor 22 outputs the resulting images (e.g., pixel values for each of the image pixels) to system memory 32 via memory controller 30. As described in more detail, in response to a user executing fashion application 26, personal computing device 12 may upload the image to one or more network devices 18 for creating virtual representations of the user.

CPU 24 may be a general-purpose or a special-purpose processor that controls operation of personal computing device 12. A user may provide input to personal computing device 12 to cause CPU 24 to execute one or more software applications. The software applications that execute on CPU 24 may include, for example, fashion application 26, as described in more detail. The user may provide input to personal computing device 12 via one or more input devices (not shown) such as a keyboard, a mouse, a microphone, a touch pad or another input device that is coupled to personal computing device 12 via user interface 34. In some examples, such as where personal computing device 12 is a mobile device (e.g., smartphone or tablet), user interface 34 may be part of display 38.

Display 38 may include a monitor, a television, a projection device, a liquid crystal display (LCD), a plasma display panel, a light emitting diode (LED) array, electronic paper, a surface-conduction electron-emitted display (SED), a laser television display, a nanocrystal display or another type of display unit. Display 38 may be integrated within personal computing device 12. For instance, display 38 may be a screen of a mobile telephone handset or a tablet computer. Alternatively, display 38 may be a stand-alone device coupled to personal computing device 12 via a wired or wireless communications link. For instance, display 38 may be a computer monitor or flat panel display connected to a personal computer via a cable or wireless link.

Camera processor 22, CPU 24, and GPU 28 may store image data, and the like in respective buffers that are allocated within system memory 32. Display interface 36 may retrieve the data from system memory 32 and configure display 38 to display the image represented by the generated image data. In some examples, display interface 36 may include a digital-to-analog converter (DAC) that is configured to convert the digital values retrieved from system memory 32 into an analog signal consumable by display 38. In other examples, display interface 36 may pass the digital values directly to display 38 for processing.

For ease of description, one or more examples are described with user interface 34 being part of display 38 (e.g., where display 38 is a touchscreen). However, the example techniques should not be considered limited to such examples.

Memory controller 30 facilitates the transfer of data going into and out of system memory 32. For example, memory controller 30 may receive memory read and write commands, and service such commands with respect to memory 32 in order to provide memory services for the components in personal computing device 12. Memory controller 30 is communicatively coupled to system memory 32. Although memory controller 30 is illustrated in the example of personal computing device 12 of FIG. 2 as being a processing circuit that is separate from both CPU 28 and system memory 32, in other examples, some or all of the functionality of memory controller 30 may be implemented on one or both of CPU 24 and system memory 32.

System memory 32 may store program modules and/or instructions and/or data that are accessible by camera processor 22, CPU 24, and GPU 28. For example, system memory 32 may store user applications (e.g., fashion application 26), resulting images from camera processor 22, rendered image content from GPU 28, etc. System memory 32 may additionally store information for use by and/or generated by other components of personal computing device 12. System memory 32 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 32 may include instructions that cause camera processor 22, CPU 24, GPU 28, and display interface 36 to perform the functions ascribed to these components in this disclosure. Accordingly, system memory 32 may be a computer-readable storage medium having instructions stored thereon that, when executed, cause one or more processors (e.g., camera processor 22, CPU 24, GPU 28, and display interface 36) to perform various functions.

In some examples, system memory 32 is a non-transitory storage medium. The term "non-transitory" indicates that the storage medium is not embodied in a carrier wave or a propagated signal. However, the term "non-transitory" should not be interpreted to mean that system memory 32 is non-movable or that its contents are static. As one example, system memory 32 may be removed from personal computing device 12, and moved to another device. As another example, memory, substantially similar to system memory 32, may be inserted into personal computing device 12. In certain examples, a non-transitory storage medium may store data that can, over time, change (e.g., in RAM).

As illustrated, one example of the software application that CPU 24 executes is fashion application 26. The user may see a thumbnail indication of fashion application 26 on display 38, and when the user wants to interact with fashion application 26 (e.g., such as when the user wants to determine fit and style of apparel or accessories), the user touches the thumbnail to execute fashion application 26 on CPU 24.

In response to executing fashion application 26, the user may be prompted, via display 38, to take an image of himself or herself (e.g., a selfie). The user may then take the selfie, ensuring that his or her face is visible. For instance, in response to interacting with the prompts provided on display 38, lens 19, and sensor 20 captures a selfie of the user that camera processor 22 process and display 38 displays within the graphical interface generated by the execution of fashion application 26. Rather than or in addition to taking a selfie, display 38, responsive to the execution of fashion application 26, may instruct the user to retrieve a pre-stored selfie from system memory 32.

In some examples, display 28, responsive to the execution of fashion application 26, may prompt the user to input body type information such as one or more of waist, height, bust, body shape, and the like. The waist, height, bust, and body shape are examples of body type parameters, and there may be additional examples of body type parameters. In some examples, in addition to or instead of inputting body type information, the user may take additional selfies that capture the full body of the user, from which body type information may be determined.

CPU 24, via execution of fashion application 26, may cause transceiver 42 to output the image (e.g., selfie image) and the user inputted body type information and/or the body image to one or more network computing devices 18 for network computing devices 18 to create a virtual representation of the user, in accordance with one or more example techniques described in this disclosure. In addition, fashion application 26 may allow the user to select, via display 38, apparels and accessories that the user may want to virtually try-on to see the style and fit. CPU 24, via execution of fashion application 26, may cause transceiver 42 to also output information of the apparels and accessories.

One or more network computing devices 18 may create the virtual representation of the user using the example techniques described in this disclosure and output graphical information of the virtual representation to personal computing device 12. As one example, network computing devices 18 may generate a series of commands and data (e.g., vertices and color information) for how GPU 28 is to render the virtual representation, and output the commands and data, which are examples of the graphical information, to personal computing device 12.

In some examples, the commands may conform to a graphics application programming interface (API), such as, e.g., an Open Graphics Library (OpenGL®) API, OpenGL® 3.3, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

GPU 28 receives (e.g., directly from transceiver 42 or from CPU 24) the commands and data generated by network computing devices 18. In response, GPU 28 performs the operations defined by the commands on the received data to render the virtual representation of the user, possibly with the virtual apparel and accessories visible to the user. GPU 28 stores the graphical data as the result of the rendering in system memory 32, and display interface 36 retrieves the graphical data for display on display 38.

In some examples, the user requests movement or some form of animation of the virtual representation from the interface provided by fashion application 26. In response, CPU 24, via fashion application 26, may request network computing devices 18 to render frames having the different movement (e.g., generate frames at 30 frames-per-second (fps)), and display 38 may display the frames at the frame rate to show smooth movement. In some examples, GPU 28 renders frames at 30 fps to animate the movement and cause display 38 to display the animation.

Moreover, display 38, via execution of fashion application 26, displays options for the user to request new apparel or accessories. In response, CPU 24, via execution of fashion application 26, causes transceiver 42 to output information of the requested apparel or accessories. Transceiver 42 receives graphical information for the newly requested apparel or accessories, and GPU 28 renders the virtual representation with the newly requested apparel or accessories.

In this way, the example techniques describe for an immersive experience for the user to determine the style and fit of an apparel or accessory without needing to physically try it on. As described, the user may desire to view the apparel and accessory on the virtual representation in run-time (e.g., real-time), so that the user can quickly determine whether to try on different apparel or accessories. Accordingly, network computing devices 18 may be configured to generate the graphical information in run-time so that personal computing device 12 can display the virtual representation and apparel and accessories in run-time.

For example, via the execution of fashion application, the user may be able to perform various tasks to determine the style and fit. Accordingly, this disclosure describes techniques to provide consumers an immersive end to end personalized 3D experience for fashion discovery and commerce on mobile. The immersive personalized 3D experience may start with the consumer or user creating a realistic 3D avatar of themselves in a few seconds with a simple 2D selfie, two core measurements, height, waist and two additional measurements, either bust, hip or weight and body shape which can be chosen from a visual.

During execution of fashion application 26, the user is provided guidance and cues to get the selfie right and a realistic avatar (e.g., virtual representation). The avatar created by the user can be edited to further customize and personalize. With the 3D avatar created, the user can then use a marketplace (e.g., as provided by execution of fashion application 26) to find apparel, accessories, beauty, and personal care products from different vendors and add them to the virtual fitting room for look and fit evaluation. Users, via fashion application 26, can also search for related items based on an existing image of an apparel or a picture taken of the apparel. The closest match found can be added to the fitting room for look and fit evaluation.

User can then evaluate and compare the apparel in a virtual fitting room, displayed via execution of fashion application 26, for look and fit by just toggling apparel available in the virtual fitting room and experience a full makeover with accessories, beauty and personal care products. Users can also place themselves in different environment settings like a town square to get a realistic sense of look and fit. Users can share their avatars with the full makeover with their friends and family for comments and feedback and complete their purchase with the shopping cart.

Figure 3:
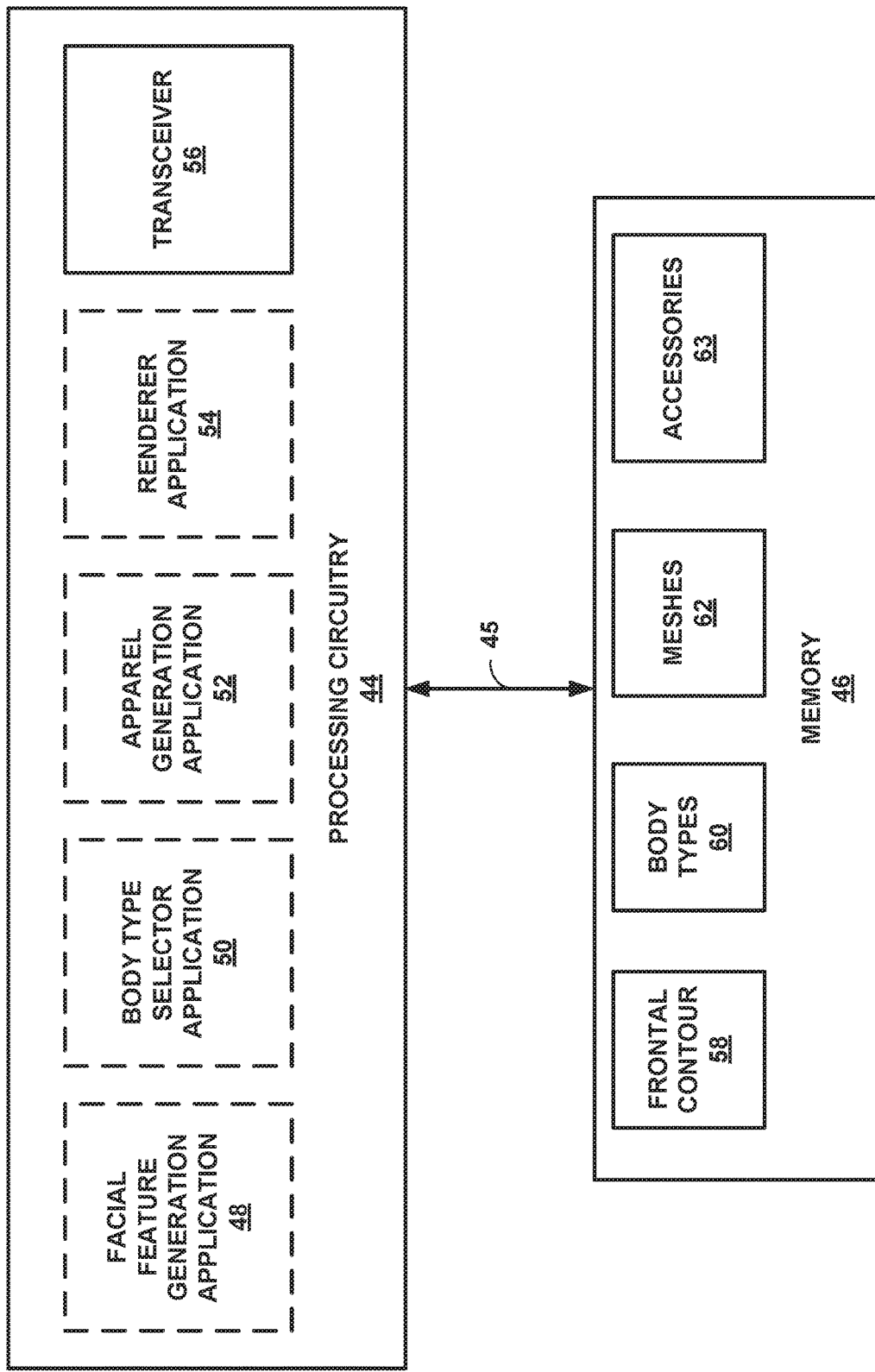
FIG. 3 is a block diagram illustrating an example of processing circuitry configured to render virtual representations of users in accordance with one or more example techniques described in this disclosure.

FIG. 3 is a block diagram illustrating an example of processing circuitry configured to render virtual representations of users in accordance with one or more example techniques described in this disclosure. FIG. 3 illustrates processing circuit 44 and memory 46. Processing circuitry 44 and memory 46 may be distributed across one or more network computing devices 18 within cloud 16. For example, as described above, cloud 16 provides a computing infrastructure where operations are distributed across network computing devices 18. Accordingly, FIG. 3 may be considered as illustrating one or more network computing devices 18 that include processing circuitry 44 and memory 46.

For example, processing circuitry 44 is illustrated as executing facial feature generation application 48, body type selector application 50, and renderer application 54. Transceiver 56 is circuitry with which processing circuitry 44 receives and transmits information. Also, memory 46 is illustrated as storing frontal contour 58, body types 60, meshes 62, and accessories 63. However, it may be possible, based on control of cloud 16 or workload of network computing devices 18 that one or more of the applications shown as executing on processing circuitry 44 execute on different network computing devices 18. Also, it may be possible that different network computing devices 18 each store some of the information shown to be stored in memory 46. For example, one network computing device 18 stores a subset of body types 60, another one of network computing device 18 stores another subset of body types 60, and so forth. The same may be true for meshes 62 and accessories 63.

The example of FIG. 3 captures these various examples where processing circuitry 44 and memory 46 are distributed among one or more network computing devices 18. As illustrated, processing circuitry 44 and memory 46 communicate via communication channel 45. Communication channel 45 may be a bus, similar to bus 40 of FIG. 1. In some examples, communication channel 45 may be a packet-based network, such as a local area network, a wide-area network, or a global network such as the Internet.

Processing circuitry 44 may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Also, memory 46 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

Although the example of FIG. 3 shows applications executing on processing circuitry 44, the example techniques are not limited to any particular type of processing circuitry. In general, processing circuitry 44 may be configured to perform one or more example techniques described in this disclosure via fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Processing circuitry 44 may include arithmetic logic units (ALUs), elementary function units (EFUs), digital circuits, analog circuits, and/or programmable cores, formed from programmable circuits. In examples where the operations of processing circuitry 44 are performed using software executed by the programmable circuits, memory 46 may store the object code of the software that processing circuitry 44 receives and executes. For example, memory 46 stores the object code for facial feature generation application 48, body type selector application 50, and renderer application 54 that processing circuitry 44 retrieves and executes.

Also, facial feature generation application 48, body type selector application 50, apparel generation application 52, and renderer application 54 are illustrated as separate simply to ease with understanding. Facial feature generation application 48, body type selector application 50, apparel generation application 52, and renderer application 54 may be structured as software functions that are called by high-level application executing on processing circuitry 44. In some examples, facial feature generation application 48, body type selector application 50, apparel generation application 52, and renderer application 54 may be integrated into a common application that processing circuitry 44 executes.

Processing circuitry 44 receives an image that includes the face of the user and body measurements. Facial feature generation application 48 may be configured to determine key facial points of reference such as face outline, eyes, nose, lips, cheek-bone, and jaw-line. The output of facial feature generation application 48 may be a data file that identifies facial outline from the image and includes information to extract out the front face portion for further processing. Also, the key facial features are used to extract out various parts of the face (lips, nose, cheeks, eyebrows, etc.), which can then later be applied to the deformed user face.

In some examples, facial feature generation application 48 may determine average skin complexion of the user. For example, facial feature generation application 48 may determine the red-green-blue (RGB) values of the pixels that form the face and perform an averaging algorithm to determine average skin complexion. Facial feature generation application 48 may use the average skin complexion to back calculate the impact of lighting conditions on the user face with respect to their average skin complexion and determine approximate relative distances of various points on the face. Based on the approximate relative distances, facial feature generation application 48 determines the 3D facial shape and contours as estimates of the face shape and contour of the user. The 3D facial shape and contours, as well as average skin complexion, key facial features points, and the like are examples of facial features extracted from the image.

Facial feature generation application 48 may store information of the facial features extracted from the image in memory 46 or local memory of processing circuitry 44. Facial feature generation application 48 retrieves the facial features and retrieves frontal contour 58 on which to apply deformations based on the facial features. For example, frontal contour 58 may be information of a 3D mesh of primitives (e.g., triangles, but other shapes are possible) that form a shape of the human head. The information of the 3D mesh of primitives may include vertex coordinates for the vertices in the 3D mesh, and information that indicates how the vertices are connected together. Frontal contour 58 may be considered as a default deformable 3D face model.

Based on the facial features (e.g., face shape and contour), facial feature generation application 48 may determine the deformations needed to apply to frontal contour 58 and stored information indicative of the deformations needed to apply (e.g., in the local memory or memory 46). The deformations needed to apply to frontal contour 58 may be a series of equations that indicate how the vertices of the 3D mesh of primitives are to shift. For example, if the user has a longer head, facial feature generation application 48 may determine how to stretch out the primitives of frontal contour 58 to form the head. If the user has a thicker head, facial feature generation application 48 may determine how to expand out the primitives of frontal contour 58, and so forth.

To perform such shifting, frontal contour 58 may include a head portion and a neck portion, with the neck portion ending with a neck seam, and the 3D mesh may include vertices of primitives for the head and neck portion and the neck seam. As described in more detail, facial feature generation application 48 may determine deformations to apply to frontal contour 58, such as deformations to apply to the head and neck portion. However, facial feature generation application 48 may not determine (or at least not apply) deformations to the neck seam to ensure that the neck seam lines up with the body. In some examples, facial feature generation application 48 may determine some deformations along the neck moving up from the neck seam (e.g., no deformations at the neck seam, and gradual deformations up the neck portion).

Facial feature generation application 48 may apply the deformations determined based on the facial features to frontal contour 58 to create a user face shape. Facial feature generation application 48 may apply (e.g., via texture mapping) the skin color and texture for various parts of the face, as extracted via facial extraction application 58, to the deformed frontal contour to create a near-real 3D face model of the user. In some examples, renderer application 54 renders (e.g., draws) the deformed frontal contour with the colors and textures, and stores the result standard 3D object formats such as .obj, .ply, .stl, .glts, .fbx, etc. depending on the rendering environment requirements (e.g., based on the rendering capabilities of personal computing device 12.

Body type selector application 50 receives body type information of the user. For example, as described above, the user may input body type information such as height, waist, bust/chest, hip, and/or weight measurements, and/or visual body type selection (e.g., apple, pear, rectangle, etc.). These measurements may be adequate from a fit perspective for standard machine-manufactured apparel as they are designed on similar body types. In some examples, body type selector application 50 may determine these measurements from full body pictures, which can avoid the user having to enter measurements. As users are likely to wear different sizes of apparel in different pictures (e.g., loose fitting or tight fitting), body type selector application 50 may utilize multiple pictures to determine an accurate estimation of the body type.

Based on the body type information, body type selector application 50 determines a body type from body types 60. For example, body types 60 are a database of pre-modelled 3D body avatars (without face or neck). Body type selector application 50 may identify the nearest match to body types 60 by matching measurements and anthropometric ratios provided by the user with measurements and anthropometric ratios of the pre-modelled 3D body avatars.

As one example, body type selector application 50 uses a k-nearest neighbors based classification to determine one of body types 60 based on the input measurements (e.g., body type information). For example, body type selector application 50 may first determine which ones of body types 60 have the same parameter as a first parameter of the body type information (e.g., which ones of body types 60 have the same height parameter as the height parameter of the user provided body type information). Based on the determination, body type selector application 50 may reduce the number of body types 60 to evaluate substantially down to a first subset of body types 60. Next, body type selector application 50 may determine which ones of the first subset of body types 60 have the same parameter as a second parameter of the body type information (e.g., which ones of body types 60 have the same waist parameter as the waist parameter of the user provided body type information). Based on the determination, body type selector application 50 may reduce the number of body types 60 to evaluate even further down from the first subset of body types 60 to a smaller, second subset of body types 60. Body type selector application 50 may repeat these operations until there is one remaining one of body types 60.

In some examples, rather than continuously reducing subsets of body types 60, body type selector application 50 may determine a Euclidean distance to determine the "closest" one of the remaining body types 60. For instance, each body type parameter may be considered as coordinates of a Euclidean point, and body type selector application 50 may determine Euclidean distances with each of body types 60.

For example, assume that the user input body type information includes four parameters (user P1, user P2, user P3, and user P4). In this example, to determine Euclidean distance with a particular body type of body types 60, body type selector application 50 may determine the difference between each of the four parameters and their respective parameters of particular body type. Body type selector application 50 may square the differences, sum the results, and determine the square root to determine the distance. For example, body type selector application 50 may determine: sqrt((user P1−body type 60A P1)$^2$+(user P2−body type 60A P2)$^2$+(user P3−body type 60A P3)$^2$+(user P4−body type 60A P4)$^2$) equals the distance to the particular body type, which is represented as body type 60A in the above equation. In some examples, to assign more value to a particular parameter (e.g., feature), body type selector application 50 may determine weighted distances which bias the result towards the dominant parameter (e.g., body type selector application 50 may select a body type from body types 60 which fits better on the user from waist point of view than height point of view). Based on the distances, body type selector application 50 may determine which one of body types 60 is the closest match to the body type of the user.

After selecting the body type, renderer application 54 may render the deformed frontal contour with a body type (e.g., as selected by body type selector application 50) based on aligning the body type with a neck seam of the deformed frontal contour to create a virtual representation of the user. In one or more examples, each one of body types 60 may be constructed such that where the neck is to attach on body types 60 substantially aligns with the neck seam of frontal contour 58. As described above, facial feature generation application 48 may not perform (or perform minimal) deformations on the neck seam of frontal contour 58. Therefore, after deformation, the neck seam of the deformed frontal contour should substantially align any one of body types 60. Accordingly, the neck seam of the deformed frontal contour, as generated by facial feature generation application 48, should substantially align the selected one of body types 60, as selected by body type selector application 50. By keeping the neck seam rigid during deformations (e.g., not deforming the neck seam), the deformed frontal contour align spatially with the neck seam of body types 60 (e.g., top of body types 60).

To render the deformed facial contour and the selected body type, renderer application 54 may blend vertices that form the neck seam with vertices at the top of mesh that forms that selected body type. The result of the blending may be a continuous structure that looks like the face and body type of the user (e.g., the result of the rendering is a body that looks like the user). Renderer application 54 may utilize the average skin color to color in the body, head, and neck of the user so that the result of the rendered head and body is aligned spatially, as well as color and texture wise. Renderer application 54 may generate the result, for export (e.g., outputting), in any of the standard 3D object formats (e.g., .obj, .ply, .stl, .fbx., .glts, etc.).

In this way, processing circuitry 44 is an example processing circuitry configured to receive an image (e.g., via transceiver 56) of a user and deform frontal contour 58 based on facial features of the image. As described, frontal contour 58 includes a head portion and a neck seam, and processing circuitry 44 may deform the head portion, but avoid deforming (e.g., bypass deforming) the neck seam.

Processing circuitry 44 may render the deformed frontal contour with a body type of body types 60 based on aligning the body type with a neck seam of the deformed frontal contour to create a virtual representation of the user. Processing circuitry 44 may then output (e.g., via transceiver 56) graphical information based on the virtual representation of the user. Examples of the graphical information includes the 3D object formats such as in .obj, .ply, .stl, .fbx., .glts, etc.

According to techniques of this disclosure, processing circuitry 44 may be configured to create 3D apparels from 2D images using image recognition techniques and real-time rendering on user generated customized avatars. Existing techniques for creating 3D meshes for apparels involve creation of a CAD/CAM (dxf) file first matching the pattern of the garment. This is similar to designing the apparel virtually after which the texture and color of the apparel is provided, and all the panels of the apparel are stitched together to create the 3D mesh. This is a time-consuming method that requires manual intervention at various stages to get the correct 3D mesh for the apparel.

This disclosure describes techniques for automatically generating a 3D mesh of an apparel based on details provided by 2D images of that apparel. To generate virtual apparel to apply to the virtual representation of the user, memory 46 stores a plurality of meshes ("meshes 62"). Meshes 62 may, for example, be created from CAD/CAM (dxf) files and may include meta-tags that store parameters. The parameters may, for example, include information regarding the pattern, style, color, print, and/or fabric for the mesh. Each mesh of meshes 62 may have an associated pattern and color. Each mesh of meshes 62 may be identified with their swatches for color & print level information. Each mesh of meshes 62 may also include fabric information provided for each of the existing pattern types.

In this context, pattern generally refers to a type of garment and represents the overall silhouette of the 3D mesh which is under consideration. Examples of patterns include a shirt, a trouser, t-shirt, dress, etc. In this context, style generally refers to a type of a pattern. For example, long sleeved, short sleeved, collared, etc. may all be styles of shirts. Fabric information generally refers to the property of the cloth being used in the apparel, and print is the design being used on that cloth to make the garment. Both are used to recreate the apparel. Examples of prints include stripes, checkers, floral, etc. or may include logos or other images.

Processing circuitry 44 receives an image that includes a piece of apparel. Apparel generation application 52 may be configured to select a mesh from meshes 62 based on an analysis of the image of the apparel. Once the image for the apparel is provided, by personal computing device 12 for example, apparel generation application 52 may perform image recognition on the image to capture information about the pattern, style, color, print, fabric, and other these key parameters for the apparel in the image. Apparel generation application 52 may store, in one or more files in memory 46 for example, meta-tags that include the captured information.

As introduced above, in order to facilitate selecting of a mesh from meshes 62, each mesh of meshes 62 may have an associated set of parameters. Apparel generation application 52 may be configured to determine parameters of the apparel based on the image and compare the parameters of the apparel to the parameters for the plurality of meshes. Examples of parameters include a pattern, style, color, print, and fabric.

Apparel generation application 52 may be configured to identity a closest matching apparel from meshes 62 using image recognition techniques and the generated meta-tag information. For example, to select a mesh from meshes 62 based on an analysis of the image, apparel generation application 52 may be configured to determine a style parameter for the apparel in the image and determining, from meshes 62, a mesh with a same style parameter. Additionally, or alternatively, to select a mesh from meshes 62 based on an analysis of the image, apparel generation application 52 may be configured to determine a pattern parameter of the apparel in the image and determine, from the plurality of meshes, a mesh with a same pattern parameter. Apparel generation application 52 may also use other parameters for determining the closest matching mesh. Apparel generation application 52 may also determine a basic color for the determined mesh.

As one example, apparel generation application 52 may be configured to determine a closest matching apparel using results provided by a visual search engine. The results may, for example, include meta-tags such as, apparel category (e.g., t-shirt, shirts, dress, jumpsuits, trouser, jeans, etc), type of neckline (e.g., round, v-neck, etc), sleeve style, sleeve length, apparel length (e.g., long, short, above knee, etc), apparel pattern (e.g, printed, stripes, checks/plaid, solid, etc), and apparel color. The visual search engine may be trained using meshes 62, such that the visual search engine is configured to find various features in meshes 62 in the images of apparels provided by a user. Both the results are provided with confidence scores (percentage confidence of matching of each inventory in that category). In some examples, apparel generation application 52 may return two kinds of results. First, apparel generation application 52 identifies the matching based on visual appearance and pattern. Second, based on the meta data extracted from the image like category, collar type, etc., apparel generation application 52 may assigns a confidence score on both kind of findings. The closest apparel mesh is estimated by comparing the confidence scores from the results and meta-tag matching.

Apparel generation application 52 may be configured to generate a swatch based on the image and apply the swatch to the mesh to generate the virtual apparel. To generate the swatch, apparel generation application 52 may be configured to determine one or more of a texture, color, or print information for the apparel in the provided image and convert this information into apparel swatches to be applied to the selected mesh from meshes 62.

Apparel generation application 52 may be configured to apply image recognition and image processing techniques in the process of creation of the new swatches for the selected apparel pattern. For example, apparel generation application 52 may be configured to perform region detection from an image. To get the maximum information out of a 2D image of an apparel, apparel generation application 52 may be configured to detect specific regions from the image using deep learning models a visual object detection system (e.g., Mask R-CNN) and generate the swatches for those regions individually. Examples of these regions include collar, sleeve, cuff, neckline, pocket, yoke, placket, waistbands, cuff-bottoms and fly. Apparel generation application 52 may be configured to perform color extraction. Apparel generation application 52 can pick separately from the regions detected by the visual object detection system and apply to the pre-existing swatches of the mesh selected before. Each swatch represents a particular region in the mesh like collar, sleeve, pocket, etc. Apparel generation application 52 extracts the color values from the image using, for example, colorgram.py library. Apparel generation application 52 may pick the color values from image pixel by pixel and store the pixel count for a color, e.g., how many times each color repeats. In some implementations, apparel generation application 52 may ignore color values having transparency (i.e. alpha <0.5) in RGBA color space to prevent misidentification of colors. Apparel generation application 52 stores the identified colors by ranks of their dominance calculated using the count (percentage of color represent in that image). The pre-existing swatches are stored with their dominant color information, for example, number of colors present in the swatch and the order of dominance with respect to the original mesh. These colors are then applied to the swatch according dominant order provided in the swatch information.

Apparel generation application 52 may also be configured to apply fabric data to the 3D apparel meshes. Apparel generation application 52 can apply fabric level information gathered from meta-tags of the apparel to achieve the right look and granularity.

To get the maximum information out of a 2D image of an apparel, apparel generation application 52 may be configured to detect specific regions in the apparel using deep learning models. The deep learning models may, for example, be configured to detect objects within an image using a visual object detection system such as Mask R-CNN (region-based convolutional neural networks). The swatches for the detected regions may be generated individually. Apparel generation application 52 may, for example, use a custom Mask R-CNN to generate a model that can be trained using a repository of images containing different kinds of apparels. Based on the training, the model can be configured to detect different classes. The classes (e.g., regions detected using the visual object detection system) may, for example, include collar, sleeve, cuff, neckline, pocket, yoke, placket, waistbands, cuff bottoms, and fly.

Apparel generation application 52 may also be configured to create textures and apply the textures to the 3D apparel meshes. Apparel generation application 52 may create the textures using image recognition techniques applied to the image provided by the user. Apparel generation application 52 may identify the texture of a given apparel from the image provided and then apply that texture, in the form of color and print swatches, on the 3D meshes in real-time.

To facilitate the creation of textures, meshes 62 may have identified swatches for color and print of each panel or region of the apparel. Details of each swatch in terms of pattern and/or style of coloring applied may be saved in the form of metatags to the image. Examples of swatch details include the swatch type (which region the swatch belongs to in the mesh example sleeve, pocket, collar, etc), total number of colors present in each swatch, and the order of coverage of the apparel mesh. This information may be pre-stored for each mesh. Once the 2D image for the apparel is obtained, apparel generation application 52 may apply image recognition techniques to the image to capture information about the color and print. Apparel generation application 52 may generate apparel swatches to apply the color and print. Apparel generation application 52 can convert the texture, color, and print information, as gathered from the provided image, into apparel swatches to be applied to the existing 3D mesh. This considers the manner in which existing swatches are applied on the 3D mesh and then the new swatches are organized in the same manner. We use proprietary image processing techniques in the creation of new swatches for the apparel.

Apparel generation application 52 may generate textures by replicating similar styles of swatches with the colors from the detected regions of the apparel 2D image. Apparel generation application 52 may be configured to extract colors from the 2D image pixel by pixel. In some examples, Apparel generation application 52 may be configured to ignore color values having transparency (i.e. alpha <0.5) in RGBA color space to prevent misidentification of colors.

Apparel generation application 52 can apply the swatches to the existing mesh to create a new 3D apparel with new texture, color, and print details. The schema of swatch application as prepared under proprietary methods of our platform leads to right allocation of new swatches for the 3D apparel. This leads to real-time creation of new 3D apparels in a highly efficient manner by utilizing the texture, color & print information from the 2D images provided.

Renderer application 54 may render the virtual apparel on the virtual representation. For example, renderer application 54 may output graphical information of the virtual apparel (e.g., as a 3D object). In this manner, the output from processing circuitry 44 may be graphical information of the virtual representation of the user along with the virtual apparel. Personal computing device 12 receives the output from processing circuitry 44 and GPU 28 renders the virtual representation with the virtual apparel on display 38 for the user to determine the style and fit. In this disclosure, processing circuitry 44 outputting graphical information includes examples where processing circuitry 44 renders the virtual representation and virtual apparel and outputs the resulting graphical information, or outputs the graphical information for the virtual representation and the virtual apparel separately.

By storing a plurality of meshes and selecting a mesh from the plurality of meshes based on an analysis of an image, in combination with other features described herein, a system such as system 10 may require little or no manual intervention in the real-time rendering of 3D apparel meshes based on user provided 2D images. Reducing or elimination the need for manual intervention potentially has the benefit of simplify ang improving a user experience. Furthermore, such an approach may reduce the amount of time needed to render on personal computing device 12, as well reduce the time needed for generation on processing circuitry 44. Accordingly, in some examples, a virtual apparel may be created relatively fast in cloud 16 and then rendered quickly on personal computing device 12.

Accessories 63 are examples of accessories and cosmetic products that are pre-registered in spatial alignment with frontal contour 58. For example, accessories 63 are pre-modeled so that accessories 63 fit on frontal contour 58 before any deformations. For example, processing circuitry 44 or some other computing device registers (e.g., identifies as corresponding) vertices of the 3D accessory or cosmetic product with respect to vertices on frontal contour 58 (e.g., by spatially registering the 3D surface of the accessory or cosmetic product with respect to the 3D surface of frontal contour 58). As illustrated, memory 46 stores the detailed propriety models as accessories 63 with all the information.

As described above, facial feature generation application 48 determines and stores information indicative of the deformations that are to be applied to frontal contour 58. In some examples, facial feature generation application 48 utilizes this stored information indicative of the deformations to determine how to morph (e.g., deform) accessories 63 to determine the style and fit of the accessory on the user. Facial feature generation application 48 may then deform the selected ones of accessories 63 In this manner, computational resources are not wasted recomputing how to deform accessories 63. Rather, deformations determined for deforming frontal contour 58 can be reused to deform accessories 63 to ensure that accessories 63 are spatially aligned with the virtual representation of the user.

Accordingly, in one or more examples, processing circuitry 44, via facial feature generation application 48, may determine deformations to apply to frontal contour 58 based on the facial features in the image, and apply the deformations based on the determined deformations. Processing circuitry 44 may retrieve a model of an accessory or cosmetic product (e.g., one of accessories 63) based on user selection. In some examples, the model of the selected one of accessories 63 is pre-registered in spatial alignment with frontal contour 58. Because accessories 63 are pre-registered in spatial alignment with frontal contour 58, facial feature generation application 48 may be able to apply deformations determined as part of deforming frontal contour 58 to deform the selected one of accessories 63.

Renderer application 54 may render the deformed model of the selected one of accessories 63 on the virtual representation. For example, renderer application 54 may output graphical information of the deformed model of the accessory or cosmetic product (e.g., as a 3D object). In this manner, the output from processing circuitry 44 may be graphical information of the virtual representation of the user along with the chosen apparel and chosen accessories. Personal computing device 12 receives the output from processing circuitry 44 and GPU 28 renders the virtual representation with the apparel and accessories on display 38 for the user to determine the style and fit. In some examples, processing circuitry 44 may separately output graphical information of the virtual representation and the virtual representation of the apparel and/or accessories. In such examples, GPU 28 may render the virtual representation, the virtual apparel, and/or the virtual accessories and stitch them together. In this disclosure, processing circuitry 44 outputting graphical information includes examples where processing circuitry 44 renders the virtual representation, virtual apparel, and virtual accessories together, and outputs the resulting graphical information, or outputs the graphical information for one or more of the virtual representation, virtual apparel, and virtual accessories, separately.

The above example techniques may be utilized to generate a static low-polygon 3D virtual representation, which is efficient to use for style and fit evaluation of apparel and accessories. Having such a static low-polygon 3D virtual representation may be beneficial because it reduces the amount of time needed to render on personal computing device 12, as well reduce the time needed for generation on processing circuitry 44. Accordingly, in some examples, the static low-polygon 3D virtual representations may be created relatively fast in cloud 16 and then rendered quickly on personal computing device 12.

Figure 4:
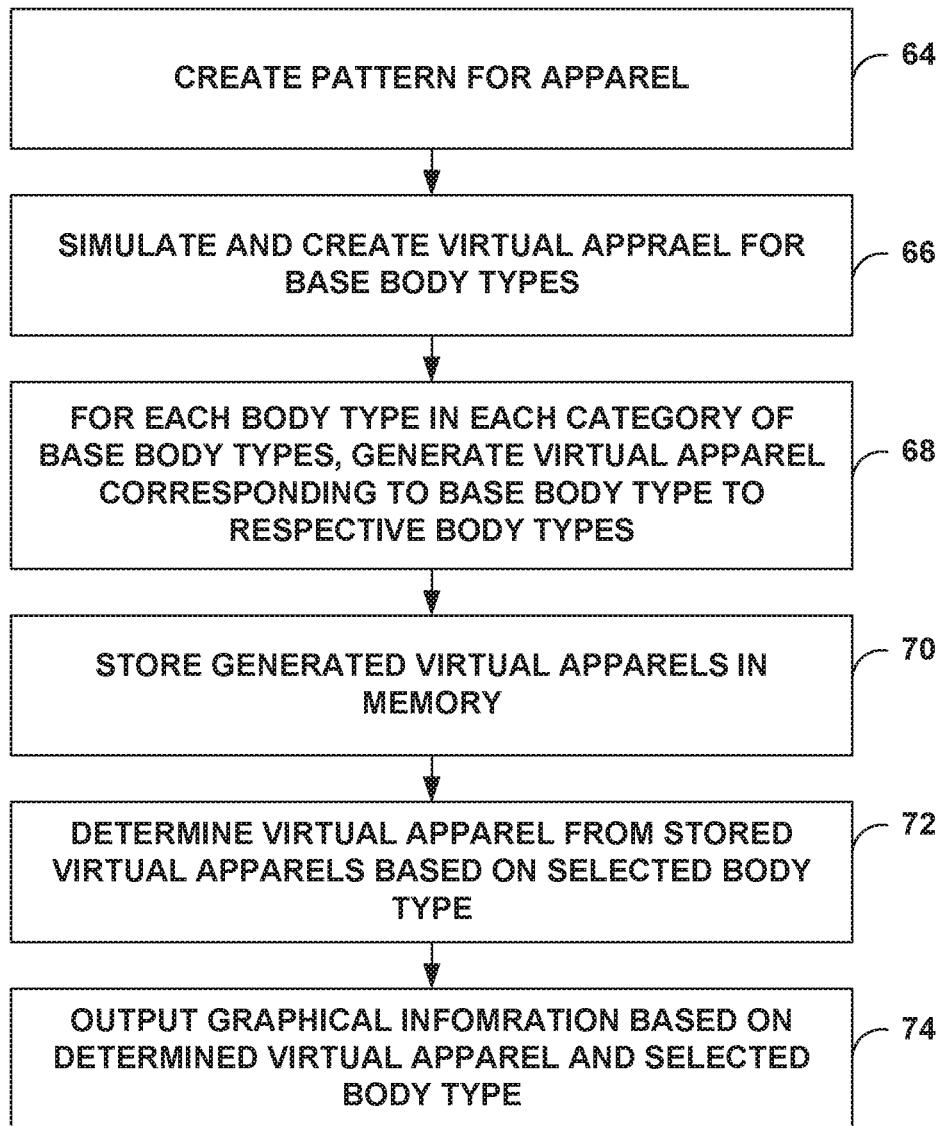
FIG. 4 is a flowchart illustrating an example method of generating and outputting virtual apparels in accordance with one or more example techniques described in this disclosure.

FIG. 4 is a flowchart illustrating an example process for generating and outputting virtual apparels in accordance with one or more example techniques described in this disclosure. In one or more examples, a user may desire to determine how apparels would appear on his or her body. To achieve that, processing circuitry 44 may be configured to generate a plurality of virtual apparels (e.g., via execution of an apparel generating application). For example, processing circuitry 44 may execute the apparel generation application.

To create the plurality of virtual apparels, an administrator may create a pattern for an apparel (64). For example, the administrator may take an image of the apparel or find an image of the apparel (e.g., online). In some examples, a designer or user may upload the image. For example, a designer may consider the ability of users to virtually try the style and fit as good advertisement, and may therefore provide the image. As another example, a user may identify an apparel for which he or she wants to determine the style and fit for his or her body.

Based on the image, the administrator may define key points on the apparel, and primitives that are used to form the apparel. From this, the administrator may define a virtual apparel mesh, and define color for the mesh based on the color in the image.

The administrator may then load up, for display on a local display, base body types from body types 60 and modify the virtual apparel mesh to fit each of the base body types (66). A base body type is a body type for which standard sizes are generated. For example, the base body types are body types that define the standard sizes of XXS (extra-extra-small), XS, S, M (medium), L (large), XL, XXL, and XXXL. For each of these body types, the administrator may manually modify the virtual apparel mesh on top of graphical presentations of body types of body types 60 that correspond to body types for these standard sizes. The administrator may store information that indicates how the virtual apparel mesh was modified for each of the base body types.

For each body type in each category of base body types, processing circuitry 44 may generate virtual apparels corresponding to each of body types 60 based on the base body types (68). Although there is a base body type that defines each of these standard sizes, there may be a plurality of body types that each fall under the same size category. For example, there may be a plurality of body types 60 for which each of the standard sizes would fit. For instance, there may be a plurality of body types 60 that would all fit under XXS, a plurality of body types 60 that would all fit under XS, and so forth.

For each of the body types in a standard size category, processing circuitry 44 may determine a difference in the body type and the base body type. Based on the difference, processing circuitry 44 may determine deformations (e.g., morphs) to apply to the virtual apparel for the base body type, and processing circuitry 44 may generate a virtual apparel that fits the corresponding body type. Processing circuitry 44 may store graphical information for the generated virtual apparel in memory 46. These operations may be all automated and require little or no human interference.

As an example, assume there are 100 body types that all fall under the L (large) category. For the first of the 100 body types, processing circuitry 44 may determine the difference in the first body type and the base body type for size L. Based on the difference, processing circuitry 44 may deform the virtual apparel for the base body type for size L to generate a virtual representation for the first body type. For the second of the 100 body types, processing circuitry 44 may determine the difference in the second body type and the base body type for size L. Based on the difference, processing circuitry 44 may deform the virtual apparel for the base body type for size L to generate a virtual representation for the second body type, and so forth. Processing circuitry 44 may store information for the resulting virtual apparels (e.g., virtual representations of the apparels) in memory 46.

In one or more examples, processing circuitry 44 may receive information from the user regarding for which apparel he or she wants to determine the style and fit. As described above, processing circuitry 44 may select a body type for the user based on user provided body type information. Processing circuitry 44 may determine a virtual apparel from the stored virtual apparels based on the selected body type (72). For example, assume that processing circuitry 44 selected the second body type of the 100 body types for size L for the user. In this example, processing circuitry 44 may determine the virtual apparel generated for the second body type of the 100 body types for size L, as described above, based on the selected body type being the second body type of the 100 body types for size L.

Processing circuitry 44 may output graphical information based on the determined virtual apparel (74). As one example, processing circuitry 44 may render the determined virtual apparel on top of the virtual representation of the user generated using the above example techniques. In this example, the graphical information may be considered as the combination of the virtual apparel rendered on the virtual representation. As another example, processing circuitry 44 may output the graphical information for the determined virtual apparel and output the graphical information for the virtual representation. GPU 28 may then render the virtual apparel on top of the virtual representation.

In this way, an administrator may simulate apparel across body types for standard size categories, which are much less in number compared to total number of body types 60, and generate and store information for these virtual apparels (e.g., as garment files). Processing circuitry 44 may automatically simulate virtual apparels across all body types 60 belonging to these size categories. For each size category, the virtual apparel corresponding to the base body type for the base size is loaded, and then all body types in that size category are loaded one after the other as morphed targets (e.g., the targets to which the virtual apparel for the base body type for the base size is to be deformed). The steps of loading, simulation, and storing virtual apparels for the different body types, using 3D simulation software, is automated to require least human intervention.

Figure 5:
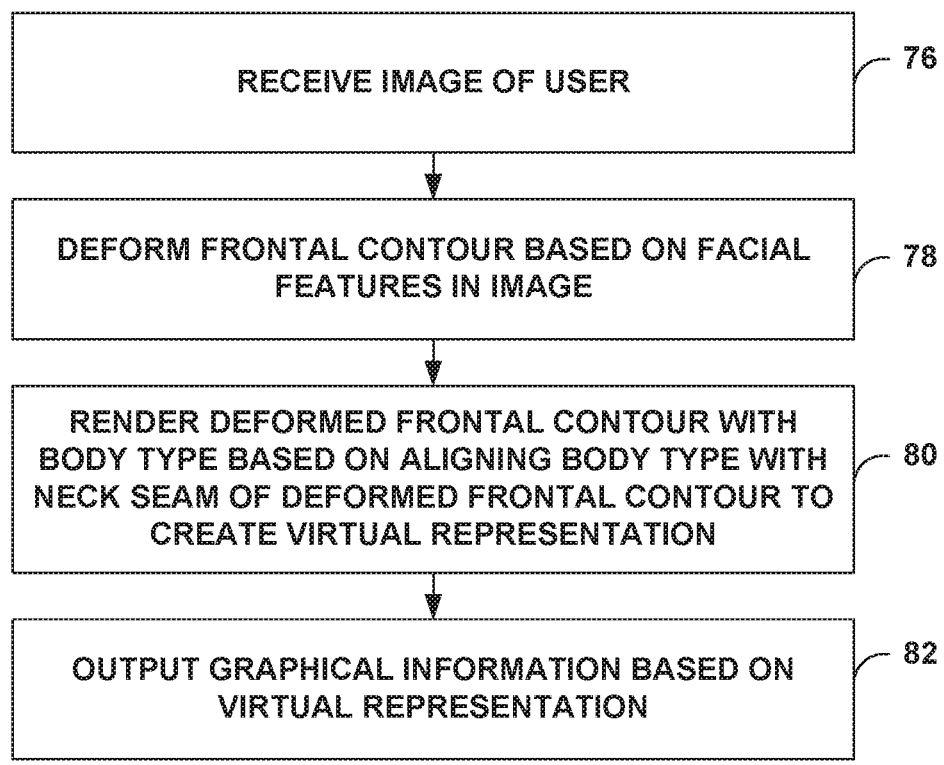
FIG. 5 is a flowchart illustrating example operations of virtual representation creation of a user.

FIG. 5 is a flowchart illustrating example operations of virtual representation creation of a user. Processing circuitry 44 may receive an image of a user (76). The image of the user includes an image of the frontal face of the user. Processing circuitry 44 may deform a frontal contour based on facial features of the image (78).

For example, processing circuitry 44 may execute facial feature generation application 48. Processing circuitry 44, via execution of facial feature generation application 48, determines skin areas in a face of the user in the image, determines an average skin complexion based on the skin areas, determines impact of lighting conditions based on the average skin complexion, determines relative distances of various points on the face based on the determined impact of the lighting conditions, and determines the facial features, including face shape and contour, based on the determined relative distances.

Based on the face shape and contour, facial feature generation application 48, executing on processing circuitry 44, determines the deformations to apply to facial contour 58 based on the face shape and contour. Facial feature generation application 48 may then apply the determined deformations to frontal contour 58. For example, frontal contour 58 includes a head portion and a neck seam (e.g., the bottom of a neck portion of frontal contour 58). Facial feature generation application 48 may apply the determined deformations to the head portion, and avoid deforming the neck seam (e.g., keep the neck seam rigid).

Processing circuitry 44, via renderer application 54, may render the deformed facial contour with a body type based on aligning the body type with a neck of the deformed frontal contour to create a virtual representation of the user (80). For example, as described above and described in more detail with respect to FIG. 6, processing circuitry 44, via execution of body type selector application 50, may select a body type for the user. The body type that processing circuitry 44 selects may be from body types 60 that are specifically constructed such that the neck seam of the body types 60 aligns substantially with the neck seam of frontal contour 58 (e.g., so that the ends of the neck seams line up, and the curvature of the neck seams line up). As described above, alignment of the neck seams means that the ends of the neck seams line up, and the curvature of the neck seams line up such that when the neck seam of the frontal contour and the neck seam of the body type line up to form a contiguous connection between head and body, with little to no gaps or such that the neck seam of the frontal contour does not extend beyond the neck seam of the body type, and vice-versa.

Because the neck seam of frontal contour 58 was not deformed during the deformation of frontal contour 58, a neck seam of the deformed frontal contour substantially aligns with the neck seam of the selected body type. Accordingly, renderer application 54 may blend the neck seam of the deformed frontal contour with the neck seam of the selected body type to create a virtual representation of the user.

Furthermore, in some examples, renderer application 54 may render skin color and facial texture to the deformed frontal contour. In such examples, renderer application 54 may render the deformed frontal contour having the skin color and facial texture with the body type (e.g., the selected body type selected by body type selector application 50).

Processing circuitry 44 may output graphical information based on the virtual representation (82). For example, processing circuitry 44 may output commands and graphics data in accordance with OpenGL such that GPU 28 of personal computing device 12 can interpret the commands and data and reconstruct the virtual representation on personal computing device 12.

Figure 6:
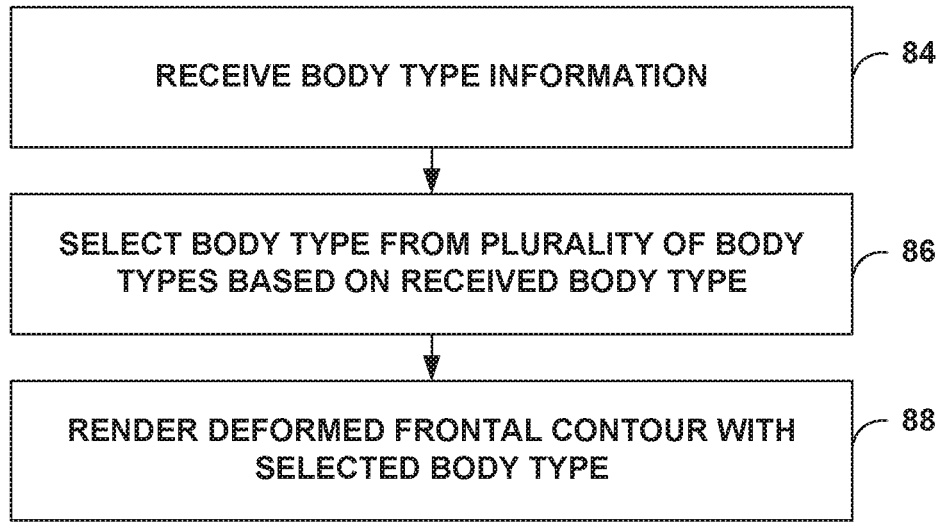
FIG. 6 is a flowchart illustrating example operations of selecting a body type for generating a virtual representation of a user.

FIG. 6 is a flowchart illustrating example operations of selecting a body type for generating a virtual representation of a user. In some examples, processing circuitry 44 receives body type information of the user (84). As one example, the user inputs height, weight, waist, bust/chest, etc. as body type parameters for the body type information. As another example, the user may provide a full body image from which processing circuitry 44 may determine the body type information.

Body type selector application 50, executing on processing circuitry 44, may select a body type from body types 60 as the body type that most closely matches the parameters of the body type information provided by the user (e.g., via input or via the image) (86). As one example, body type selector application 50 may determine a first subset of body types 60 from the plurality of body types 60 having the same parameter as a first parameter of the received body type information (e.g., determine body types 60 having the same height parameter as the height parameter of the received body type information). Body type selector application 50 may determine a second subset, from the first subset, having the same parameter as a second parameter of the received body type information (e.g., determine body types 60 from the first subset having the same waist parameter as the waist parameter of the received body type information).

Body type selector application 50 may determine a body type from the second subset of body types as a closest match to the received body type information to select the body type. For example, body type selector application 50 may determine a Euclidean distance between each body type in the second subset and determine which one of the body types in the second subset has the smallest distance. If there is a tie between multiple body types, then body type selector application 50 may utilize a tie breaking algorithm. For instance, body type selector application 50 may determine among the body types having the same Euclidean distance, which one has a third parameter that is closest to a third parameter of the user provided body type information, and try the fourth parameter, fifth parameter, and so on, until body type selector application 50 finds a body type where there is no tie. Body type selector application 50 may select that body type as the body type that is the closest match to the body type of the user.

Renderer application 54 may render the deformed frontal contour with the selected body type (88). For example, as described above, renderer application 54 may blend the neck seam of the deformed frontal contour with the neck seam of the selected body type to create the virtual representation of the user.

Figure 7:
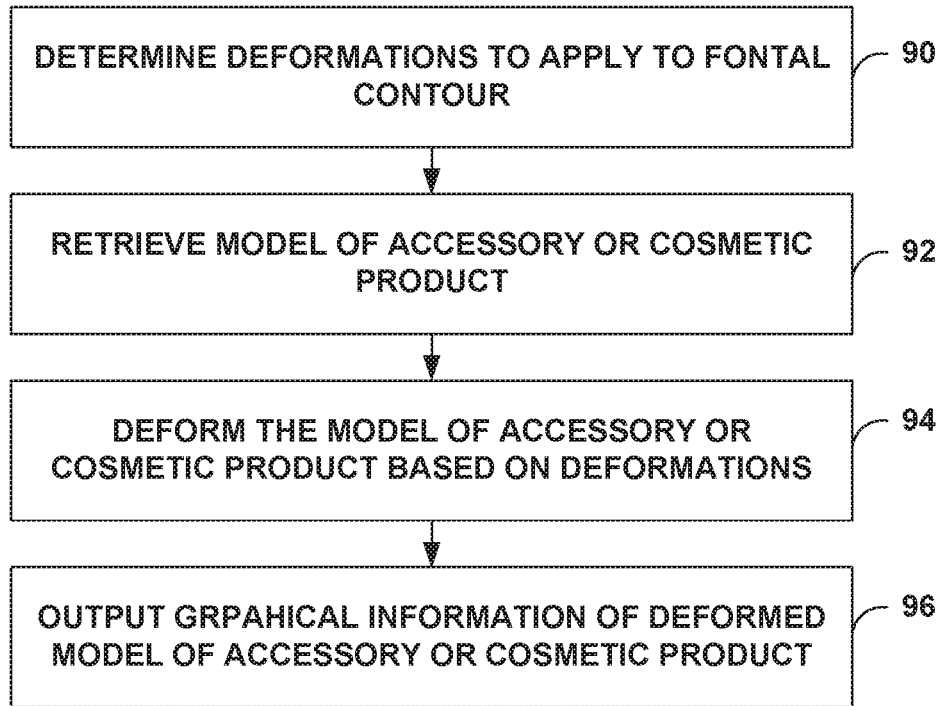
FIG. 7 is a flowchart illustrating example operations of generating a virtual representation accessories or cosmetics to apply to a virtual representation of a user.

FIG. 7 is a flowchart illustrating example operations of generating a virtual representation accessories or cosmetics to apply to a virtual representation of a user. As described above, during the deformations performed to frontal contour 58, facial feature generation application 48 may determine the deformations to apply to frontal contour 58 based on the facial features in the image of the face of the user (90).

Processing circuitry 44 may receive information indicating for which one of accessories from accessories 63 a user wants to determine the style and fit. Facial feature generation application 48 may retrieve a model of accessory from accessories 63 based on the user selection (92).

Facial feature generation application 48 may deform the model of the accessory product based on the determined deformations that deformation application had determined to be applied to frontal contour 58 (94). As described above, accessories 63 may be pre-registered in spatial alignment with frontal contour 58, which means that virtual representations of the accessories (e.g., accessories 63) may be formed such that accessories 63 fit on frontal contour 58. Therefore, deformations applied to frontal contour 58 may be indicative of deformations to be applied to accessories 63 for fast construction of accessories and how they will look on the user. For example, facial feature generation application 48 may scale, shift, expand, contract, etc. the model of the accessory based on the deformations applied to frontal contour 58.

Processing circuitry 44 may output graphical information of the deformed model of the accessory (96). As one example, renderer application 54 may render the deformed model of the accessory on-top-of the virtual representation of the user, and processing circuitry 44 may output graphical information for the combined virtual representation of the user with the deformed model of the accessory (e.g., virtual representation of the accessory). As another example, renderer application 54 may output the virtual representation of the user and output the virtual representation of the accessory. GPU 28 may then stitch the virtual representation of the accessory to the virtual representation of the user.

Figure 8:
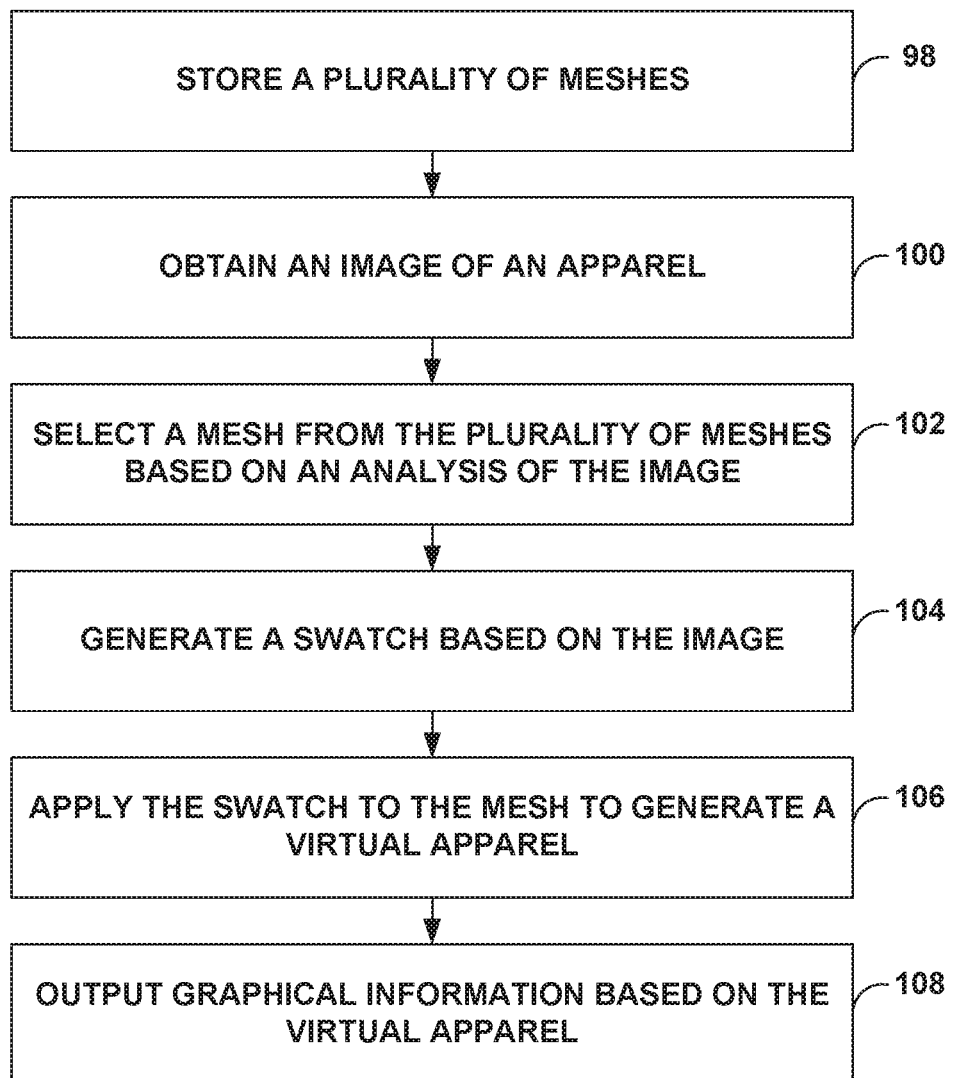
FIG. 8 is a flowchart illustrating example operations of generating a virtual apparel to apply to a virtual representation of a user.

FIG. 8 is a flowchart illustrating example operations of generating a virtual representation of apparel to apply to a virtual representation of a user. As described in more detail above, memory 46 may store a plurality of meshes (98). Each mesh of the plurality of meshes may have an associated set of parameters.

Processing circuitry 44 receives an image of an apparel (100). As one example, a user may identify the image of the apparel using personal computing device 12, and personal computing device 12 may transmit the image to cloud 16 via network 14. Processing circuitry 44 may receive the image of the apparel within cloud 16.

Processing circuitry 44 selects a mesh from the plurality of meshes stored in memory 46 based on an analysis of the image (102). For example, processing circuitry 44 may execute apparel generation application 52. Processing circuitry 44, via execution of apparel generation application 52, may select a mesh from the plurality of meshes based on the analysis of the image by determining a style parameter for the apparel in the image and determining, from the plurality of meshes, a mesh with a same style parameter. Additionally, or alternatively, processing circuitry 44, via execution of apparel generation application 52, may select the mesh from the plurality of meshes based on the analysis of the image by determining a pattern parameter of the apparel in the image and determining, from the plurality of meshes, a mesh with a same pattern parameter.

Processing circuitry 44 generates a swatch based on the image (104). To generate the swatch based on the image, processing circuitry 44 may determine a color of the apparel in the image and match a color of the swatch to the color of the apparel in the image. To generate the swatch based on the image, processing circuitry 44 may determine a texture of the apparel in the image and match a texture of the swatch to the texture of the apparel in the image. To generate the swatch based on the image, processing circuitry 44 may determine a print of the apparel in the image and match a print of the swatch to the print of the apparel in the image.

Processing circuitry 44 applies the swatch to the mesh to generate a virtual apparel (106). Processing circuitry 44 may output graphical information based on the virtual apparel. As one example, renderer application 54 may render the virtual apparel on-top-of the virtual representation of the user, and processing circuitry 44 may output graphical information for the combined virtual representation of the user with the virtual apparel. As another example, renderer application 54 may output the virtual representation of the user and output the virtual apparel. GPU 28 may then stitch the virtual representation of the accessory to the virtual representation of the user.

The following pseudo code describes an example process for generating a virtual apparel. In the pseudo code below, the operations described as being performed by a front-end interface may, for example, be performed by personal computing device 12, and the operations described as being performed by a backend server may be performed by network computing devices 18.

Front-End Interface:
1. Upload user selected image to Visenze Image Search results API and Visenze meta tags API
2. Get Visenze Response: Image search results, Meta tags with bounding box
3. Crop image as per bounding box
4. Upload cropped image to S3 server
5. On uploaded successfully, combine Visenze response (filter image search results as per Avataar gender)+uploaded image s3 path in json and call 2D-3D backend server In backend server (written in python),
1. Download image from S3 path
2. Start Parallel processing
Thread 1: Region detection using Mask R-CNN
Thread 2: Get SKU_ID and download texture files
Thread 1: Mask R-CNN is trained to detect following regions: sleeve, neckline, collar, cuff, pocket, placket, yoke, waistband, cuff-bottoms and fly.
PROGRAM MaskRCNN
Regions detected=MaskRCNN prediction on image
IF Regions detected has confidence score>0.9 THEN
mask image=Create mask for that region.
END
Thread 2:
a. Map Visenze meta tags with meta-tags stored for each SKU in database
b. Get SKU_ID from meta-tags and image search results
c. Create CSV file of texture information of selected SKU
PROGRAM GetSKUID
READ meta-tags, image search results
FOR imageSearchResult in image search results
IF imageSearchResult confidence score>0.5 AND (imageSeachResult confidence score>meta-tag confidence score OR imageSeachResult sub category=meta-tag sub category) THEN
SKU_ID=imageSeachResult [SKU_ID]
return
ENDFOR
IF sku_id not found THEN
sku_id_list=Get SKU_IDs by matching all meta-tags
IF sku_id_list=nil THEN
SKU_ID=Get SKU_ID by matching few tags
return
ELSE
SKU_ID=Get SKU_ID present in both sku_id_list and imageSearchResults return
END
d. Download textures/swatches for the selected SKU_ID
e. Create CSV file of texture information fetched for selected SKU from database.
Note:
CSV Format: Swatch filename, TotalColors present in swatch, Dominant Color Information, Swatch file path, Swatch Type
Swatch Type refers to the region of apparel the swatch belongs to. This is same as regions detected in Mask R-CNN
End Parallel processing
3. Apply PhotoRecolor Algorithm on swatches (written in C++)
PROGRAM PhotoReColorAlgorithm
READ csvFile, user_image (downloaded from S3), total number of colors in selected SKU.
user_image_without_background=Remove background from user_image using Grab-cut open cv library to avoid picking up unnecessary colors from background
FOR swatch_info IN swatch_info list read from csvFile
READ TotalColors (present in swatch, Dominant Color Information, Swatch file path, Swatch Type, mask images created from Mask R-CNN region detection.
IF mask image present=Swatch type in swatch_info THEN
dest_palette=Pick TotalColors (present in swatch) from mask image and order them according to Dominant Color Information using colorgram.py library
orig_palette=Pick TotalColors (present in swatch) from swatch image using colorgram.py library
Replace orig_palette to dest_palette in swatch image using algorithm taken from Palette-based Photo Recoloring paper
(For Example:
TotalColors present in swatch=3
dest_palette=(color1, color2, color3)
orig_palette=(orig_color1, orig_color2, orig_color3)
Replace orig_color1 with color1 in swatch image, orig_color2 with color2 in swatch image
and orig_color3 with color3 in swatch image.)
ELSE
dest_palette=Pick TotalColors (present in swatch) from user_image_without_background and order them according to Dominant Color
Information using colorgram.py library
orig_palette=Pick TotalColors (present in swatch) from swatch image using colorgram.py library
Replace orig_palette to dest_palette in swatch image using algorithm taken from Palette-based Photo Recoloring paper
ENDFOR
END
4. Upload the new swatches containing transferred colors to S3.
5. Return SKU_ID and S3 path of uploaded swatches/texture files to front-end.

In the algorithm above, thread 1 runs the region detection algorithm which identifies different regions of the apparels. Thread 2, during the same time, downloads the texture files that need to be recolored from those detected region to the backend server from the file server. SKU_ID is a unique id to identify the SKU at the backend which matches the image search algorithm and modifies that sku to create the new one. The confidence score defines how much the machine learning algorithm is confident in identifying the property. Based on the confidence score, the system decides how the recoloring and modification will take place. S3 represents a backend server. Visenze Image Search is an example of a third party image search engine which returns the meta tags and visual search results, although other third party search engines may also be used.

The above example techniques describe ways in which to render a virtual representation of a user and to generate virtual apparels. The user may desire to determine how the virtual apparel appears when worn by the virtual representation. However, rendering the virtual apparel on the virtual representation may not be error free. Some portions of the virtual apparel may be rendered within the virtual representation, which can appear as holes in the virtual apparel.

For example, as described above with respect to FIG. 4, in some examples, processing circuitry 44 may be configured to render a virtual apparel on top of a virtual representation of a user or output information that allows GPU 28 to render the virtual apparel on top of the virtual representation. In such cases, there may be a possibility that the virtual apparel does not properly render on the virtual representation creating holes in the virtual apparel (e.g., because parts of the virtual apparel are within the virtual representation).

As another example, as also described above with respect to FIG. 4, in some examples, processing circuitry 44 may be configured to render a virtual apparel on different body types, where one of the body types is used to generate the virtual representation of the user. In such examples, as part of the rendering the virtual apparel on the different body types, there may be holes in the virtual apparel because parts of the virtual apparel are within the body types.

In such cases, it may be possible to manually evaluate each body type having the virtual apparel rendered on top to determine if there are any holes and manually adjust the virtual apparel to address the holes. However, doing such manual updates on a large batch of body types may be time consuming and prone to induce manual errors.

This disclosure describes example techniques to determine whether there are holes in the virtual apparel and techniques that require minimal to no manual intervention to address the holes in the virtual apparel. The example techniques may be performed by processing circuitry 44 or may be performed by GPU 28.

For example, processing circuitry 44, via renderer application 54, may be configured to detect and correct for holes in the virtual apparel as part of rendering the virtual apparel on top of the body types or as part of rendering the virtual apparel on the virtual representation. In such examples, processing circuitry 44 may output graphical information of the virtual apparel rendered with the virtual representation to personal computing device 12 where GPU 28 reconstructs the virtual apparel with the virtual representation (e.g., from the perspective of GPU 28 the virtual apparel and the virtual representation are just one common graphical object to be rendered).

In some examples, processing circuitry 44 may cause cloud 16 to output the virtual representation of the user and the virtual apparel. In such examples, GPU 28 may be configured to render the virtual apparel on top of the virtual representation. In such examples, GPU 28 may be configured to perform the example techniques described in this disclosure to address the holes in the virtual apparel.

Accordingly, the example techniques may be performed in cloud 16 with processing circuitry 44 or may be performed at personal computing device 12 with GPU 28. For ease of description only, the example techniques are described with respect to processing circuitry 44. However, these example techniques may be performed by GPU 28 as well. Therefore, operations of processing circuitry 44 may also be considered as operations of processing circuitry of GPU 28, where the processing circuitry of GPU 28 includes fixed-function and programmable circuitry.

As described in more detail, processing circuitry 44 may be configured to perform a point correction algorithm and an edge collision correction algorithm. In some examples, processing circuitry 44 may perform the point correction algorithm followed by the edge collision correction algorithm. However, the example techniques are not so limited. In some examples, processing circuitry 44 may perform the point correction algorithm and not perform the edge collision correction algorithm or perform an algorithm different than the edge collision correction algorithm. As another example, processing circuitry 44 may perform the edge collision correction algorithm but may not perform the point correction algorithm or perform some other algorithm. Therefore, although the example techniques are described with the point correction algorithm occurring first followed by the edge collision correction algorithm, the example techniques should not be considered so limited. The point correction algorithm and the edge collision correction algorithm can be performed independent and separate from one another.

In one or more examples, processing circuitry 44 may determine a body construct. The term "body construct" is used to generically refer to a construct that is used to determine whether the virtual apparel would be rendered inside the virtual representation of the user. As one example, the body construct may be a construct that forms the virtual representation of the user. As another example, the body construct may be a construct of the body type for a priori rendering. In this disclosure, processing circuitry 44 determining a body construct used for generating a shape of a virtual representation of a user is used to mean the determination of a body construct used to determine whether the virtual apparel would be rendered within the virtual representation of the user. For instance, processing circuitry 44 determining a body construct used for generating a shape of a virtual representation of user may be used to mean that the body construct is the construct of the actual virtual representation of the user or the construct of a body type that is used as the body type of the virtual representation of the user.

The body construct may be, as one example, the contour of the body type or the virtual representation of the user. For instance, processing circuitry 44 may generate a three-dimensional contour that represents the shape and size of the body type or the virtual representation. The body construct may be, as one example, by the three-dimensional contour that represents the shape and size of the body type or the virtual representation. Generating the three-dimensional contour may facilitate and reduce the computations needed because not all information of the body type or virtual representation is needed (e.g., color information etc.). However, in some examples, it may be possible to use the actual body shape or virtual representation as the body construct.

For the point correction algorithm and the edge collision correction algorithm, the inputs may be the body construct and the virtual apparel. Additional, optional inputs may include an inner boundary which does not allow the virtual apparel to go inside specific areas and/or an outer boundary which does not allow the virtual apparel to go outside specific areas. For instance, the example techniques described in this disclosure may be extended to cases where the user desires to view the style and fit of multiple layers of apparel. As one example, the user may desire to view the style and fit of a shirt and a jacket on top of the shirt. In this example, for the shirt, the body construct would form one boundary (e.g., the shirt should not go inside the body construct), and the jacket would form an outer boundary because the shirt should not go outside the jacket. For the jacket, the shirt would form an inner boundary because the jacket should not go inside the shirt.

The techniques are described with respect to virtual apparel on the body construct. However, the example techniques may be extended to examples where there are multiple layers of virtual apparel.

In one or more examples, processing circuitry 44 may generate the body construct as a plurality of primitives (e.g., triangles) that are interconnected at respective vertices. The example techniques are described with respect to triangles, but other types of primitives like quads may be used. In examples where triangles are used, if the body construct is formed as quads or some other polygon, processing circuitry 44 may divide the quads or other polygons into triangles (e.g., via tessellation techniques as one example way to perform the division).

In case of triangles, the surface is always one dimensional, so the point correction algorithm and the edge collision correction algorithm are sufficient to determine collision between virtual apparels and the body construct. However, for quads or higher dimensional primitives, a surface collision check may need to be performed followed by the point correction algorithm and the edge collision correction algorithm to determine whether any part of the surface of that primitive collides with the body construct or not. If there is collision, the surface may be divided into lower dimension primitive and collision check on those new primitives may be repeated. It may be undesirable to subdivide higher dimension primitives into lower dimension without checking the surface collision. For instance, in case there is no collision, the demotion of primitive dimension may cause fashion loss in those areas.

Similar to the body construct, the virtual apparel may be a plurality of primitives that are interconnected at vertices. Processing circuitry 44 may determine whether points on the virtual apparel are within the body construct. As one example, the points on the virtual apparel may be the vertices of the primitives, but the example techniques are not so limited. In some examples, processing circuitry 44 may compare the (x, y, z) coordinates of the points in the primitives of the virtual apparel to (x, y, z) coordinates of points on the body construct to determine if the point in the virtual apparel is within the body construct. As one example, z-buffering or depth buffering algorithms used by graphics processing units (GPUs) may be an example of the algorithm that processing circuitry 44 uses to determine whether a point in the virtual apparel is within the body construct.

Once processing circuitry 44 determines that a point of the virtual apparel is within the body construct, processing circuitry 44 may perform the point correction algorithm to extend the point outside the body construct. For example, in a first iteration of the point correction algorithm, processing circuitry 44 may extend the point to be in the same plane as other neighboring points that are external to the body construct. Then in a second iteration of the point correction algorithm, if the point is still within the body construct, processing circuitry 44 may determine a normal vector for the point, as described in more detail, and extend the point along the normal vector until the point is outside the body construct.

In some cases, it may be possible that although the point of the virtual apparel is outside the body construct, that an edge extending from that point of the virtual apparel is within the body construct. In such a situation, a primitive of the virtual apparel intersects with a primitive of the body construct, which is also referred to as edge collision.

Processing circuitry 44 may then perform the edge collision correction algorithm. In the edge collision correction algorithm, processing circuitry 44 may sub-divide the primitives that intersect (e.g., edge collide) with primitives of the body construct. After sub-division, processing circuitry 44 may determine whether vertices of any of the sub-divided primitives are within the body construct. If so, processing circuitry 44 may perform the example techniques of the point correction algorithm to extend those vertices outside the body construct; however, techniques in addition to or instead of the point correction algorithm may be used to extend the points outside the body construct. Also, after sub-division, processing circuitry 44 may determine whether any of the sub-primitives intersect with primitives of the body construct. If so, processing circuitry 44 may further sub-divide the sub-divided primitives, and repeat the example operations until the further sub-divided primitives (which may be from multiple iterations of the edge collision algorithm) do not have points that are within the body construct (e.g., after extending the points using the point correction algorithm or some other algorithm) and none of the further sub-divided primitives intersect any of the primitives of the body construct.

The edge collision correction algorithm may provide one or more advantages, although achieving these advantages in every case may not be necessary. As one example, one technique may be to push any primitive of the virtual apparel that intersect a primitive of the body construct to be outside the body construct. However, in such a technique, the fashion elements of the virtual apparel may be lost. For example, the virtual apparel may drape a certain way, and by pushing out the primitive of the virtual apparel, the virtual apparel may no longer drape in the intended manner.

With the example techniques described in this disclosure, by further dividing the primitives of the virtual apparel that intersect with the body construct the fashion elements of the virtual apparel are preserved. For example, the primitives of the virtual apparel are made smaller and smaller (e.g., by the sub-division) to limit the number of points that need to be extended out. For instance, instead of the entire primitive being pushed out to the body construct, just a small divided primitive is pushed out. This allows for the fashion elements of the virtual apparel to be preserved. Accordingly, by decimating the primitive into sub-primitives, processing circuitry 44 resolves the issue of edge collision in a more granular level so that the shape of the virtual apparel is not disrupted.

In some examples, where appropriate, after processing circuitry 44 performs the above example techniques with respect to the body construct. Then, processing circuitry 44 may perform similar techniques with an inner boundary construct that is a three-dimensional representation of the inner boundary and may perform similar techniques with an outer boundary construct that is a three-dimensional representation of the outer boundary.

Once processing circuitry 44 corrects for the holes using the above example techniques, one more issue may persist when two primitives of the virtual apparel come too close to primitive on the body construct. In that case, the common edge between the two primitives may cross the area of the body construct, and this crossing may not be found when utilizing the above techniques which divide quads into triangles and do the calculation.

In some examples, processing circuitry 44 may calculate the area curvature of those quads and check if the issue that two primitives of the virtual apparel come too close to a primitive of the body construct (e.g., a quad primitive in this case). If that appears, processing circuitry 44 may divide the quad primitive into triangles and perform the example techniques with the triangles to ensure that the virtual apparel is not within the body construct.

The above example techniques are described with respect to processing circuitry 44. In some examples, processing circuitry 44 may be configured to perform these example operations are part of execution of renderer application 54. However, the techniques are not so limited. In some examples, the point correction algorithm and edge collision correction algorithm may be separate functions that processing circuitry 44 executes or may be functions that renderer application 54 calls. In some examples, some other software executing on processing circuitry 44 may configure processing circuitry 44 to perform the example techniques, or processing circuitry 44 may include fixed-function circuitry that is configured to perform the example techniques.

Figure 9A:
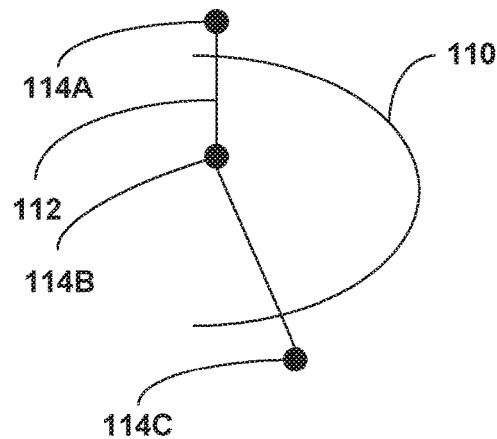
FIGS. 9A and 9B are conceptual diagrams illustrating an example technique of extending a point on a virtual apparel towards a body construct of a virtual representation of a user.
Figure 9B:
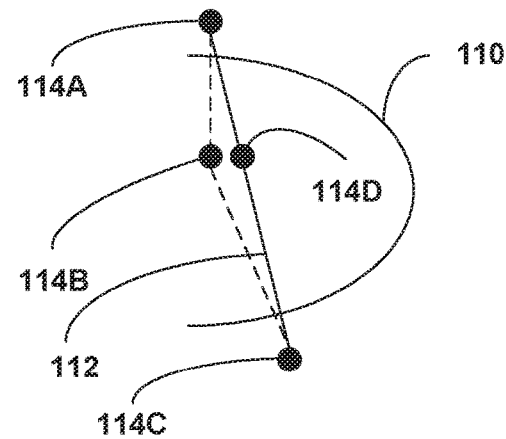

FIGS. 9A and 9B are conceptual diagrams illustrating an example technique of extending a point on a virtual apparel towards a body construct of a virtual representation of a user. For instance, FIGS. 9A and 9B illustrate an example of a first iteration of the point correction algorithm. In FIGS. 9A and 9B, part of virtual apparel 112 is within body construct 110. As illustrated in FIG. 9A, virtual apparel 112 includes points 114A, 114B, and 114C. Points 114A, 114B, and 114C may be vertices of primitives of virtual apparel 112, but the techniques are not so limited. Points 114A and 114C are external to body construct 110, and point 114B is within body construct 110.

In this example, processing circuitry 44 may determine the point inside (e.g., point 114B) is connected to which group of points that are external to the body construct (e.g., points 114A and 114C). Processing circuitry 44 may perform a so-called flood feel algorithm to determine that point 114B is connected to points 114A and 114C. Examples of the flood feel algorithm are available from www.techiedelight.com/flood-fill-algorithm/. For instance, by the flood feel algorithm uses a start node, a target color, and a replacement color. The algorithm looks for nodes in an array that are connected to the start node by a path of the target color and changes them to the replacement color as a way to identify which points are interconnected. Flood feel algorithm is one example, and other example techniques may be utilized instead of or in addition to the flood feel algorithm.

Based on points 114A and 114C (e.g., the points external to body construct 110), processing circuitry 44 may determine a position for where point 114B should be. For instance, FIG. 9B illustrates an example of where point 114B should be and is illustrated as point 114D. As one example, processing circuitry 44 may determine the position of point 114B to be the position of point 114D such that point 114A, 114B, and 114C form a common plane.

Extending point 114B to the position of point 114D may be more advantageous then simply extending point 114B to a nearest point that the external to body construct 110. If point 114B were simply extended to nearest point that is external to body construct 110, the result may be tangling of the virtual apparel. Such tangling may be complicated and computational extensive to resolve. Therefore, performing the iterative process of the point correction algorithm may not require untangling of the virtual apparel.

Moreover, some points on virtual apparel 112 may become rendered so that the nearest point is actually the back of body construct 110 but based on the neighboring points that are external to body construct 110, the point should be in the front of body construct 110. By simply extending the point to the nearest point on body construct 110, the point would end up on the back instead of the front causing tangling. With the example techniques described in this disclosure, the issues present with tangling of virtual apparel 112 may be minimized.

As illustrated in FIG. 9B, even after extending point 114B to the position of point 114D, parts of virtual apparel 112 are within body construct 110. For example, point 114D is still inside body construct 110. The techniques of FIGS. 9A and 9B may be considered as a first iteration of the point correction algorithm. As described in more detail below, in a second iteration of the point correction algorithm, processing circuitry 44 may determine how to extend point 114D so that the position is outside of body construct 110.

FIGS. 10A-10D are conceptual diagrams illustrating another example technique of extending a point on a virtual apparel towards a body construct of a virtual representation of a user. For instance, the example techniques of FIGS. 10A-10D may be performed after the example techniques of FIGS. 9A and 9B. However, it is possible to perform the example techniques of FIGS. 10A-10D without processing circuitry 44 performing the techniques of FIGS. 9A and 9B or based on processing circuitry 44 performing some other techniques. In other words, the example techniques of FIGS. 10A-10D do not require for processing circuitry 44 to have performed the example techniques of FIGS. 9A and 9B.

Figure 10A:
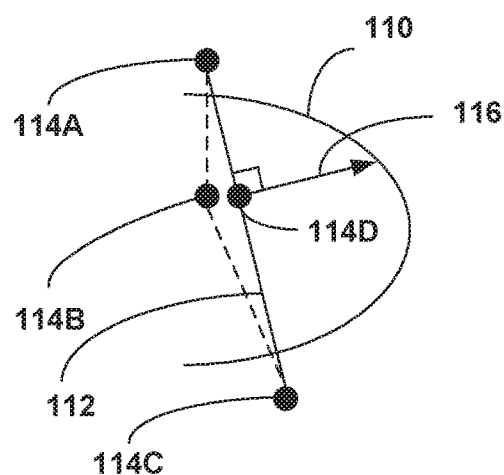
FIGS. 10A-10D are conceptual diagrams illustrating another example technique of extending a point on a virtual apparel towards a body construct of a virtual representation of a user.

In the example of FIGS. 10A-10D, processing circuitry 44 may have performed the example techniques of FIGS. 9A and 9B. For instance, FIG. 10A illustrates the position of point 114D and the previous position of point 114B. In one or more examples, processing circuitry 44 may determine a normal vector 116 that is a normal vector for point 114D.

Normal vector 116 may be orthogonal to a plane formed by point 114D and one or more neighboring points (e.g., points 114A and 114C). For instance, as illustrated in FIG. 10A, normal vector 114D is orthogonal to the plane formed by points 114A, 114D, and 114C. In this example, processing circuitry 44 may determine a plane based on the interconnections of points 114A, 114D, and 114C.

Figure 10B:
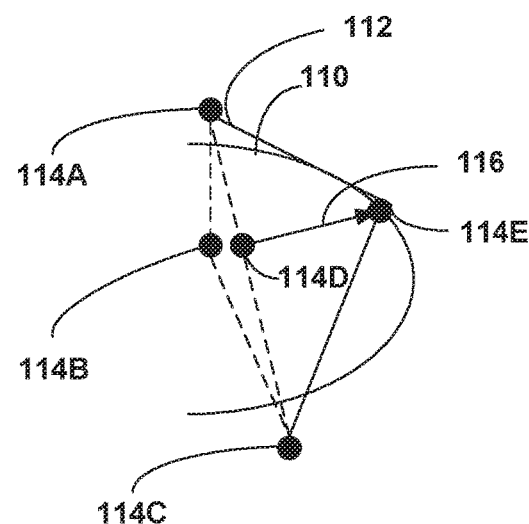

Moreover, as illustrated in FIG. 10A, normal vector 116 is oriented towards body construct 110 (e.g., points towards body construct 110) and intersects point 114D. As illustrated in FIG. 10B, processing circuitry 44 may extend point 114D along the normal vector 116 to corresponding point 114E. Corresponding point 114E is at the location wherein normal vector 116 intersects body construct 110. In some examples, because processing circuitry 44 initially extended point 114B to location of point 114D (e.g., in the example illustrated in FIGS. 9A and 9B) before performing the example techniques of FIGS. 10A-10D, the chances of there being any tangling of virtual apparel 112 is minimized.

In some examples, processing circuitry 44 may generate graphical information of virtual apparel 112 based on the extension of point 114D to corresponding point 114E on body construct 110. For instance, the result of operations of the point correction algorithm may be sufficient to generate virtual apparel 112 that is external to body construct 110. In such examples, processing circuitry 44 may generate the graphical information that renderer application 52 may use to render the virtual apparel on the virtual representation or on the body types. As another example, processing circuitry 44 may output the graphical information for GPU 28 to render the virtual apparel on the virtual representation of the user.

The above examples of FIGS. 9A, 9B, 10A, and 10B are described with respect to one point of virtual apparel 112. Processing circuitry 44 may perform similar operations with respect to other points of virtual apparel 112 that are within body construct 110.

For instance, processing circuitry 44 may determine body construct 110 used for generating a shape of a virtual representation of a user. Processing circuitry 44 may also determine that one or more points (e.g., point 114D in FIG. 9B or 10A) of virtual apparel 112 are within body construct 110.

For each of the one or more points, processing circuitry 44 may determine a respective normal vector (e.g., normal vector 116). Each respective normal vector intersects each respective point and is oriented towards body construct 110. Processing circuitry 110 may extend each of the one or more points to corresponding points (e.g., point 114E) on body construct 110 based on each respective normal vector. Processing circuitry 44 may generate graphical information of virtual apparel 112 based on the extension of each of the one or more points to the corresponding points on body construct 110.

As described above, in some examples, processing circuitry 44 may perform the operations of FIGS. 9A and 9B before performing the operations of FIGS. 10A and 10B. Accordingly, in some examples, the one or more points on virtual apparel 112 that are within body construct 110 may be considered as a first set of one or more points on virtual apparel 112 that are within body construct 110. For example, point 114D may be part of the first set of one or more points that are within body construct 110.

Processing circuitry 44 may be configured to determine an initial set of one or more points (e.g., point 114B is a point in the initial set) on virtual apparel 112 that are within body construct 110. Processing circuitry 44 may determine one or more points (e.g., points 114A and 114C) of virtual apparel 112 that are external to body construct 110 and connected to the initial set of one or more points (e.g., to point 114B) of virtual apparel 112 that are within the body construct 112. As illustrated in FIG. 9B, processing circuitry 44 may extend the initial set of one or more points (e.g., point 112B) based on the determination of one or more points (e.g., points 114A and 114C) of virtual apparel 112 that are external to body construct 110 and connected to the initial set of one or more points (e.g., to point 114B). In some examples, the first set of one or more points (e.g., point 114D) are the result of extending initial set of one or more points (e.g., of extending point 114B).

In some examples, performing the point correction algorithm may be sufficient to construct virtual apparel 112 that is external to body construct 110, and processing circuitry 44 may generate graphical information of virtual apparel 112 based on the extension of each of the one or more points to the corresponding points on body construct 110 as per the point correction algorithm. However, there may be situations where point correction algorithm is insufficient to ensure that part of virtual apparel 112 is not within body construct 110.

For example, as illustrated in FIG. 10B, point 114E and point 114A form an edge that is external to body construct 110. However, point 114E and point 114C form an edge that is still internal to body construct 110. Therefore, there may still be a part of virtual apparel 112 that is within body construct 110 after the point correction algorithm. The edge between point 114E and point 114C may be considered as an edge that collides with one or more primitives of body construct 110. For instance, if points 114E and point 114C were vertices of a primitive of virtual apparel 112, then the primitive of virtual apparel 112 may intersect with one or more primitives of body construct 110. To address this situation, processing circuitry 44 may perform the edge collision correction algorithm.

Figure 10C:
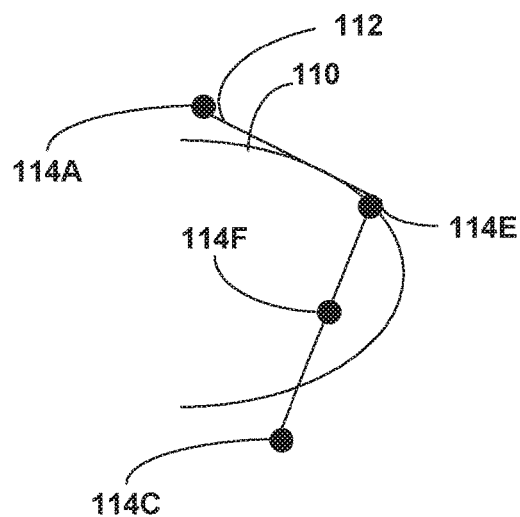
Figure 10D:
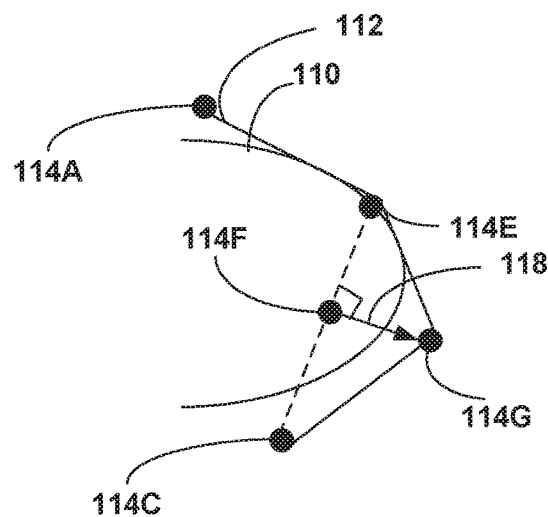
Figure 12A:
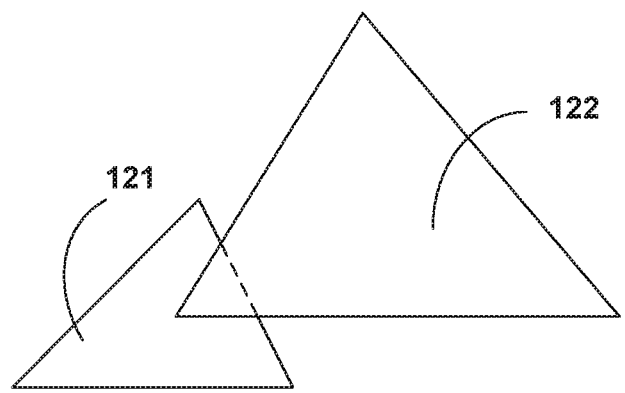
FIGS. 12A and 12B are conceptual diagrams illustrating an example technique to address edge collision between a primitive of a virtual apparel and a primitive of a body construct of a virtual representation of a user.
Figure 12B:
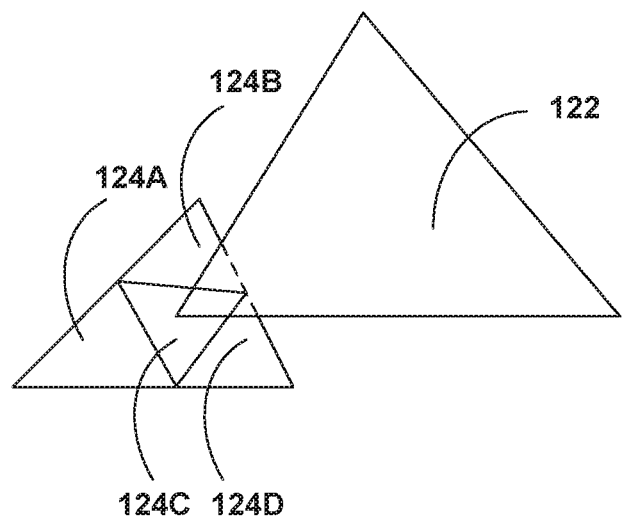

The edge collision correction algorithm is described in more detail with respect to FIGS. 12A and 12B. In general, the result of the edge collision correction algorithm may be additional vertices that processing circuitry 44 may extend out of body construct 110. For example, as illustrated in FIG. 10C, point 1114F may be a point along the line between points 114C and 114E. In some examples, point 114 may be vertex generated from the result of the edge collision correction algorithm. As illustrated in FIG. 10D, processing circuitry 44 may repeat the operations of the point correction algorithm. As one example, processing circuitry 44 may determine normal vector 118 and extend point 114F along normal vector 118 until point 114F is external to body construct, as illustrated with point 114G. In this way, points 114A, 114E, 114G, and 114E of the virtual apparel are all outside body construct 110.

Figure 11A:
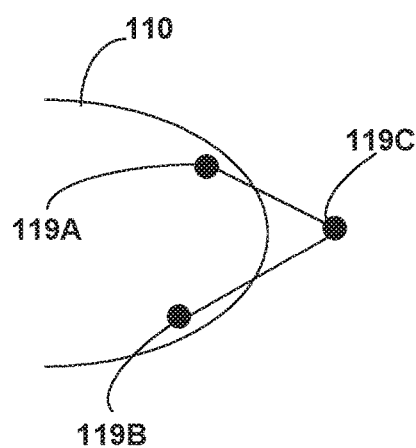
FIGS. 11A and 11B are conceptual diagrams illustrating an example of pulling back a point on a virtual apparel towards a body construct of a virtual representation of a user.
Figure 11B:
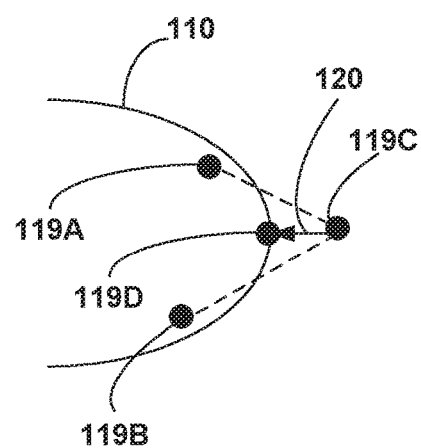

FIGS. 11A and 11B are conceptual diagrams illustrating an example of pulling back a point on a virtual apparel towards a body construct of a virtual representation of a user. Pulling back a point on a virtual apparel is another example of extending a point, but in this case the point is being extended backwards relative to the examples of FIGS. 9A, 9B, and 10A-10D. In the examples of FIGS. 9A, 9B, and 10A-10D, processing circuitry 44 is described as extending a point out of body construct 110. In some examples, it may be possible that a point on the virtual apparel is already too far outside of body construct 110, which in turn would cause the virtual apparel to appear to be baggy or loose on the user. For instance, as illustrated in FIG. 11A, points 119A-119C form vertices of a triangle, and point 119C is too far external to body construct 110. As illustrated in FIG. 11B, processing circuitry 44 may determine a normal vector 120 that intersects with body construct 110, and pulls back point 119C (e.g., extends point 119C) toward body construct 110, as shown with respect to point 119D. The operations to perform the example of FIGS. 11A and 11B are similar to those described above with respect to FIGS. 9A, 9B, and 10A-10D, but in the opposite direction.

FIGS. 12A and 12B are conceptual diagrams illustrating an example technique to address edge collision between a primitive of a virtual apparel and a primitive of a body construct of a virtual representation of a user. For instance, FIGS. 12A and 12B illustrate example operations of the edge collision correction algorithm.

FIG. 12A illustrates virtual apparel primitive 121 and body construct primitive 122. As one example, virtual apparel primitive 121 may be primitive of virtual apparel 112 after processing circuitry 44 performs the example techniques of the point correction algorithm. However, the techniques described in this disclosure are not so limited. In some examples, virtual apparel primitive 121 may be primitive of virtual apparel 112 where processing circuitry 44 did not perform the point correction algorithm, some other correction algorithm, or performed no correction algorithm.

As illustrated in FIG. 12A, virtual apparel primitive 121 intersects body construct primitive 122, as shown with the dashed line. The dashed line on the edge of virtual apparel primitive 121 means that there is edge collision between virtual apparel primitive 121 and body construct primitive 122.

In accordance with example techniques described in this disclosure, to address the edge collision, processing circuitry 44 may sub-divide virtual apparel primitive 121 into a plurality of sub-primitives. As one example, as illustrated in FIG. 12B, processing circuitry 44 may determine a vertex along each edge of virtual apparel primitive 121 (e.g., at a halfway point). Processing circuitry 44 may interconnect the existing vertices of virtual apparel primitive 121 to the vertices along the edges to generate sub-primitives 124A, 124B, 124C, and 124D, as illustrated in FIG. 12B. There may be other ways in which to generate the sub-primitives, and the example techniques are not so limited.

For the edge collision correction algorithm, processing circuitry 44 may then determine whether any of the sub-primitives 124A, 124B, 124C, and 124D intersect with primitive 122. If so, processing circuitry 44 may further divide the sub-primitives, and may repeat such operations (e.g., for multiple iterations) until there are further divided sub-primitives that do not intersect primitive 112.

In addition, processing circuitry 44 may determine whether any of the points on the sub-primitives 124A, 124B, 124C, and 124D are within body construct 110. If so, processing circuitry 44 may perform the example techniques of the point correct algorithm to extend the point outside body construct 110. However, it may be possible for processing circuitry 44 to perform other techniques as well other than or in addition to the point correction algorithm. Processing circuitry 44 may determine whether any primitives formed with the extended points (e.g., which are vertices in some examples) using the point correction algorithm intersect with primitive 122 and perform the edge collision correction algorithm for those primitives.

In this way, processing circuitry 44 may perform the edge collision correction algorithm until there are no further divided sub-primitives that intersect primitive 122, and in some examples, until there are no points (e.g., vertices) in the further divided sub-primitives that are within body construct 110 (e.g., possibly after performing the point correction algorithm). The result of the edge collision correction algorithm may be graphical information based at least in part on the further divided sub-primitives such as virtual apparel 112 that is external to body construct 110 and with its fashion elements intact.

Figure 13:
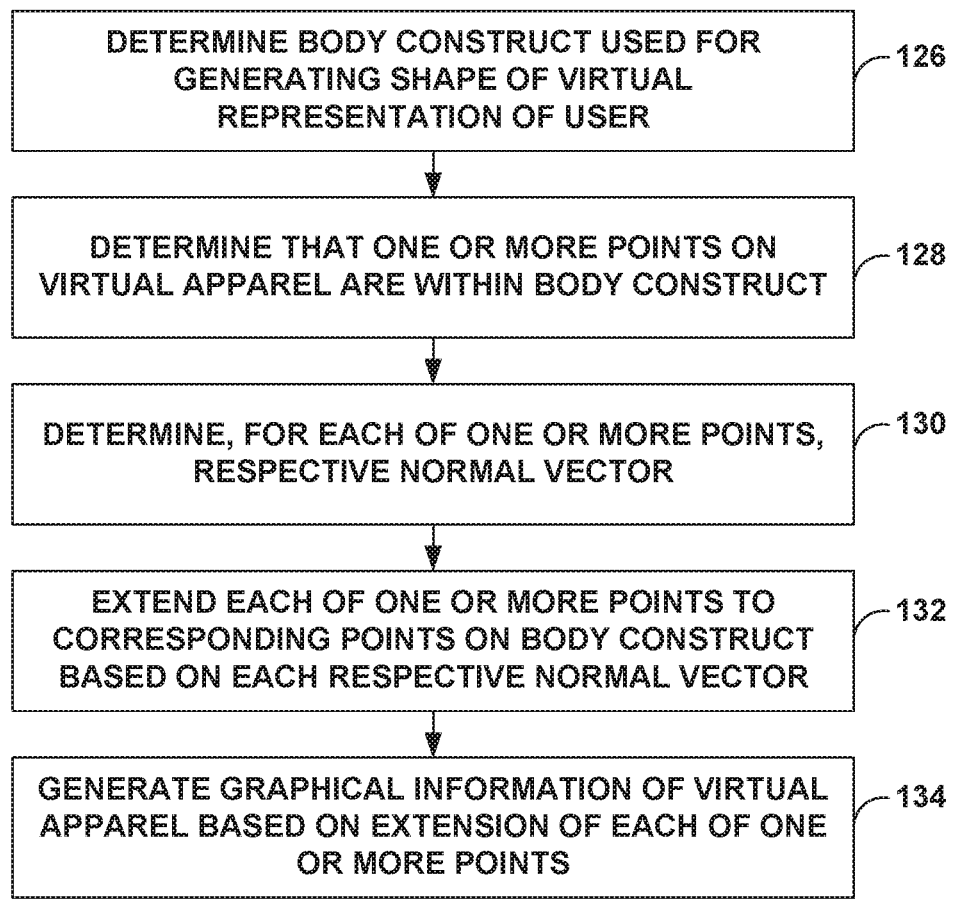
FIG. 13 is a flowchart illustrating an example of operations of apparel simulation.

FIG. 13 is a flowchart illustrating an example of operations of apparel simulation. For example, FIG. 13 illustrates an example of the point correction algorithm. Processing circuitry 44 may determine a body construct used for generating a shape of a virtual representation of a user (126). As described, the body construct may be a three-dimensional shape of the body types used to generate the virtual representation, may be a contour of the virtual representation, or may be the virtual representation, as a few examples.

Processing circuitry 44 may determine that one or more points on the virtual apparel are within the body construct (128). As one example, the one or more points on the virtual apparel may be the vertices of primitives that form the virtual apparel. Processing circuitry 44 may use the x, y, z coordinates of the points and the x, y, z coordinates of the body construct to determine whether points on the virtual apparel are within the body construct. For example, processing circuitry 44 may use z-buffering techniques to determine whether the points are within the body construct.

Processing circuitry 44 may determine, for each of the one or more points, a respective normal vector (130). Each respective normal vector intersects each respective point and is oriented towards the body construct. For example, processing circuitry 44 may determine, for each of the one or more points, a respective plane based on interconnections of the one or more points and neighboring points. Processing circuitry 44 may determine the respective normal vector as a vector that is orthogonal to each respective plane.

Processing circuitry 44 may extend each of the one or more points to corresponding points on the body construct based on each respective normal vector (132). For example, as illustrated in FIG. 10B, processing circuitry 44 may extend point 114D to corresponding point 114E. The corresponding points may be points on the body construct where the respective normal vectors intersect the body construct.

Processing circuitry 44 may generate graphical information of the virtual apparel based on the extension of each of the one or more points to the corresponding points on the body construct (134). In some examples, processing circuitry 44 may render the virtual apparel on the virtual representation of the user based on the graphical information, and output information of the rendered virtual apparel on the virtual representation. In some examples, processing circuitry 44 may output the graphical information for rendering of the virtual apparel on the virtual representation of the user (e.g., by GPU 28 of personal computing device 12).

In some examples, prior to performing the example of FIG. 11, processing circuitry 44 may first move some of the points inside the body construct based on points that are already external to the body construct to avoid issues with tangling. For example, the points of the virtual apparel that are within the body construct, as used in FIG. 11, may be considered as first set of one or more points.

Processing circuitry 44 may be configured to determine an initial set of one or more points on the virtual apparel that are within the body construct (e.g., point 112B of FIG. 9A). Processing circuitry 44 may determine one or more points of the virtual apparel that are external to the body construct (e.g., points 112A and 112C) and connected to the initial set of one or more points (e.g., point 112B) of the virtual apparel that are within the body construct. Processing circuitry 44 may extend the initial set of one or more points based on the determination of one or more points of the virtual apparel that are external to the body construct and connected to the initial set of one or more points.

In one or more example, the result of extending the initial set of points is the first set of points. For example, in FIG. 9A, point 112B is a point in the initial set of point. Point 112B is extended towards body construct 110 and to be at the position of point 112D. Point 112D may be a point in the first set of points that is then extended in accordance with the example of FIG. 13.

In some examples, after the point correction algorithm, processing circuitry 44 may perform the edge collision correction algorithm. Example techniques of edge collision correction algorithm are described in more detail with respect to FIG. 14. However, in general, in one example, processing circuitry 44 may generate primitives of the virtual apparel based at least in part on the extended one or more points to the corresponding points on the body construct and determine primitives of the virtual apparel that intersect with primitives of the body construct. Processing circuitry 44 may divide the determined primitives of the virtual apparel into a plurality of sub-primitives and determine that one or more vertices of the sub-primitives are within the body construct. Based on the determination that one or more vertices of the sub-primitives are within the body construct, processing circuitry 44 may extend the one or more vertices of the sub-primitives to be external to the body construct. In such examples, processing circuitry 44 may generate the graphical information based on the extension of the one or more vertices of the sub-primitives to be external to the body construct.

As another example, processing circuitry 44 may generate primitives of the virtual apparel based at least in part on the extended one or more points to the corresponding points on the body construct and determine primitives of the virtual apparel that intersect with primitives of the body construct. Processing circuitry 44 may divide the determined primitives of the virtual apparel into a plurality of sub-primitives and determine that one or more of the sub-primitives intersect with primitives of the body construct. Based on the determination that one or more of the sub-primitives intersect with primitives of the body construct, processing circuitry 44 may further divide the one or more sub-primitives that intersect with the primitives of the body construct (e.g., until determined that the further divided sub-primitives do not intersect with the primitives of the body construct).

Figure 14:
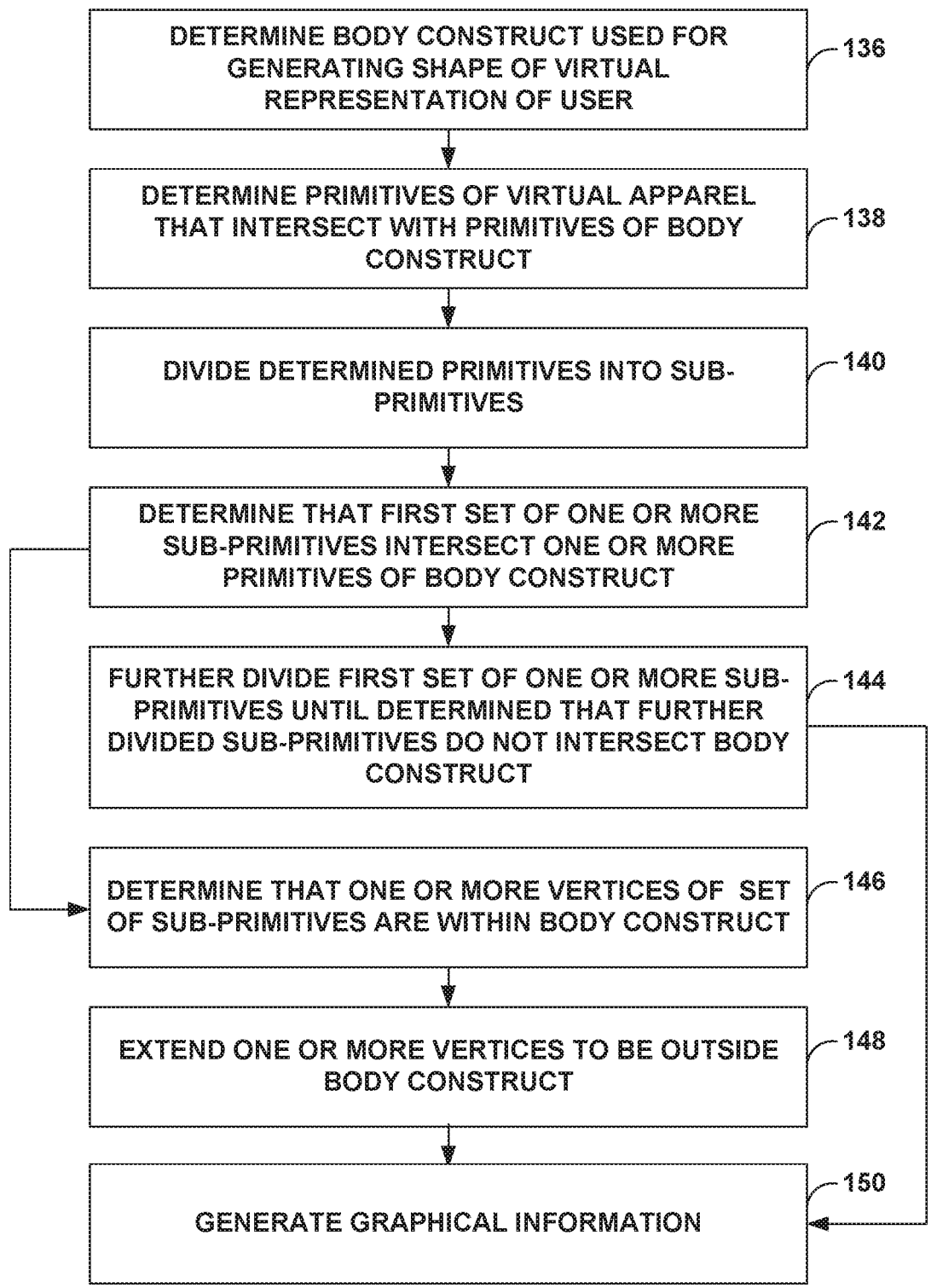
FIG. 14 is a flowchart illustrating another example of operations of apparel simulation.

FIG. 14 is a flowchart illustrating another example of operations of apparel simulation. As illustrated, and similar to FIG. 13, processing circuitry 44 may determine a body construct used for generating a shape of a virtual representation of a user (136) and may determine primitives of a virtual apparel that intersect with primitives of the body construct (138).

Processing circuitry 44 may divide the determined primitives of the virtual apparel into a plurality of sub-primitives (140). For example, processing circuitry 44 may determine respective vertices along each edge of the determined primitives, and generate the sub-primitives based on the determined respective vertices. For example, processing circuitry 44 may generate sub-primitives 124A, 124B, 124C, and 124D from primitive 121 as illustrated in FIG. 12B.

Processing circuitry 44 may determine that a set of one or more of the sub-primitives intersect with one or more primitives of the body construct (142). As merely an example to assist with understanding, assume that processing circuitry 44 divides a primitive into four sub-primitives (e.g., similar to FIG. 12B). Assume that a first and a second sub-primitive intersect with one or more primitives of the body construct.

Based on the determination that the set (e.g., first and second sub-primitives) intersect with one or more primitives of the body construct, processing circuitry 44 may further divide the set of one or more sub-primitives until determine that the further divided sub-primitives do not intersect with the primitives of the body construct (144). For example, processing circuitry 44 may go through multiple iterations of dividing to generate the next further divided sub-primitives until the further divided sub-primitives do not intersect the primitives of the body construct. In some examples, the sub-primitives may be those that are also generated from extending one or more vertices out of the body construct.

In some examples, processing circuitry 44 may be configured to generate graphical information at least in part on the further divided sub-primitives (150). For example, the further divided sub-primitives may ensure that the fashion elements of the virtual apparel are maintained. Based on the graphical information, processing circuitry 44 may render the virtual apparel on the virtual representation or output the graphical information so that GPU 28 can render the virtual apparel on the virtual representation.

Assume that the first and second sub-primitives are a first set of sub-primitives. A second set of sub-primitives may include the third and the fourth sub-primitives. In some examples, processing circuitry 44 may determine that the second set of sub-primitives are within the body construct (146). In some examples, the second set of sub-primitives may also include sub-primitives whose vertices were extended out of the body construct as part of the multiple iterations performed until the further divided sub-primitives do not intersect the primitives of the body construct.

Processing circuitry 44 may be configured to perform the point correction algorithm to push the vertices of the sub-primitives that are within the body construct. For example, processing circuitry 44 may, based on the determination that the one or more vertices of the second set of the one or more sub-primitives are within the body construct, extend the one or more vertices to be outside the body construct in accordance with the point correction algorithm, as one example, although other techniques are possible (148).

Processing circuitry 44 may be configured to generate graphical information (150). For example, to generate the graphical information, processing circuitry 44 may be configured to generate the graphical information based at least in part on the further divided sub-primitives and the extended one or more vertices.

The following is pseudocode that processing circuitry 44 may implement to perform the example techniques described in this disclosure. In the pseudocode, VertexCollisionDection refers to determining whether a point (e.g., vertex) of a primitive of the virtual apparel is within the body construct. Cloth refers to the virtual apparel, and body refers to the body construct. VertexCollisionResolver is an example of the point correction algorithm. EdgeCollisionDetection refers to determining whether primitives of the virtual apparel intersect with primitives of the body construct. EdgeCollisionResolver is an example of the edge collision correction algorithm. InnerBoundaries is the construct of the inner boundary, and outerBoundaries is the construct of the outer boundary.

```
NestedCageAlgo{
    Input: Cloth, body, innerBoundaries, outerBoundaries
    While not resolved{
        VertexCollisionDetection(cloth, body)
        If detected{
            VertexCollisionResolver(cloth, body)
        }
        EdgeCollisionDetection(cloth, body)
        If detected{
            EdgeCollisionResolver(cloth, body)
        }
        If no issue detected then break the loop
    }
    While not resolved{
        VertexCollisionDetection(cloth, innerBoundaries)
        If detected{
            VertexCollisionResolver(cloth, innerBoundaries)
        }
        EdgeCollisionDetection(cloth, innerBoundaries)
        If detected{
            EdgeCollisionResolver(cloth, innerBoundaries)
        }
        If no issue detected then break the loop
    }
    While not resolved{
        VertexCollisionDetection(cloth, outerBoundaries)
        If detected)
            VertexCollisionResolver(cloth, outerBoundaries)
        }
        EdgeCollisionDetection(cloth, outerBoundaries)
        If detected{
            EdgeCollisionResolver(cloth, outerBoundaries)
        }
        If no issue detected then break the loop
    }
}
VertexCollisionDetection(cloth, body){
    vertsInside= [ ]
    For each vertex in cloth{
        If vertex is inside{
            vertsInside.add(vertex)
        }
    }
    Return vertsInside
}
VertexCollisionResolver(cloth, body){
    For vert in vertsInside{
        If loop == 1{
            Calculate the neighbor points outside the body using flood fill algorithm.
            Calculate the position based on the neighbor Points
            Push the point to that position.
        }else{
```

-continued

```
            Calculate the nearest body surface towards the normal direction of the
vert.
            Push the point outside of the surface.
        }
    }
}
EdgeCollisionDetection(cloth, body){
    collidedTries = [ ]
    For each tri in cloth{
        If any edge collides with any edge of the body{
            collidedTries = tri
        }
    }
    Return collidedTries
}
EdgeCollisionResolver(cloth, body){
    For each tri in collidedTries{
        Add vertex in the middle of each edge of the tri.
        add 4 tries created by the 6 points to the list of tries for the cloth.
    }
    If any tri got broken return not resolved else return resolved.
}
```

The techniques of this disclosure may be implemented in a wide variety of computing devices. Any of the described units, modules or components may be implemented together or separately as discrete but interoperable logic devices. Depiction of different features as applications or units is intended to highlight different functional aspects and does not necessarily imply that such applications or units must be realized by separate hardware or software components. Rather, functionality associated with one or more applications or units may be performed by separate hardware or software components, or integrated within common or separate hardware or software components.

The techniques described in this disclosure may be implemented, at least in part, in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry. The terms "processor," "processing circuitry," "controller" or "control module" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as random access memory (RAM), read-only memory (ROM), non-volatile random access memory (NVRAM), electrically erasable programmable read-only memory (EEPROM), FLASH memory, magnetic media, optical media, or the like that is tangible. The computer-readable storage media may be referred to as non-transitory. A server, client computing device, or any other computing device may also contain a more portable removable memory type to enable easy data transfer or offline data analysis. The instructions may be executed to support one or more aspects of the functionality described in this disclosure.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the devices, systems, and methods in accordance with the description provided in this disclosure are provided below.

The invention claimed is:

1. A method of apparel simulation, the method comprising:
   determining a body construct used for generating a shape of a virtual representation of a user;
   determining that points on a virtual apparel are within the body construct;
   determining, for each of the points, a respective normal vector, wherein each respective normal vector intersects each respective point and is oriented towards the body construct;
   extending each of the points to corresponding points on the body construct based on each respective normal vector;
   generating primitives of the virtual apparel based at least in part on the extended points to the corresponding points on the body construct;
   determining primitives of the virtual apparel that intersect with primitives of the body construct;
   dividing the determined primitives of the virtual apparel into sub-primitives, wherein each of the sub-primitives is (1) smaller in size than a primitive of the determined primitives that is divided and is (2) within the primitive of the determined primitives;
   determining that one or more vertices of the sub-primitives are within the body construct;
   based on the determination that one or more vertices of the sub-primitives are within the body construct, extending the one or more vertices of the sub-primitives to be external to the body construct;
   repeatedly dividing the sub-primitives and extending the further divided sub-primitives to be external to the body construct until determined that the further divided sub-primitives do not intersect with the primitives of the body construct; and
   generating graphical information of the virtual apparel based on the extension of the one or more vertices of the further divided sub-primitives to be external to the body construct.

2. The method of claim 1, wherein determining that the points on the virtual apparel are within the body construct comprises determining that a first set of points on the virtual apparel are within the body construct, the method further comprising:
- determining an initial set of points on the virtual apparel that are within the body construct;
- determining points on the virtual apparel that are external to the body construct and connected to the initial set of points; and
- extending the initial set of points based on the determination of points on the virtual apparel that are external to the body construct and connected to the initial set of one or more points,
- wherein determining, for each of the points, the respective normal vector comprises determining, for each of the first set of points, the respective normal vector;
- wherein extending each of the points to corresponding points on the body construct based on each respective normal vector comprises extending each of the first set of points to corresponding points on the body construct based on each respective normal vector, and
- wherein generating graphical information of the virtual apparel based on the extension of each of the points to the corresponding points on the body construct comprises generating graphical information of the virtual apparel based on the extension of each of the first set of points to the corresponding points on the body construct.

3. The method of claim 1, wherein determining, for each of the points, the respective normal vector comprises:
- determining, for each of the points, a respective plane based on interconnections of the points and neighboring points; and
- determining the respective normal vector as a vector that is orthogonal to each respective plane.

4. The method of claim 1, wherein determining that the points on the virtual apparel are within the body construct comprises determining that vertices of one or more primitives of the virtual apparel are within the body construct.

5. The method of claim 1, further comprising:
- rendering the virtual apparel on the virtual representation of the user based on the graphical information.

6. The method of claim 1, further comprising:
- outputting the graphical information for rendering of the virtual apparel on the virtual representation of the user.

7. A method of apparel simulation, the method comprising:
- determining a body construct used for generating a shape of a virtual representation of a user;
- determining primitives of a virtual apparel that intersect with primitives of the body construct;
- dividing the determined primitives of the virtual apparel into sub-primitives, wherein each of the sub-primitives is (1) smaller in size than a primitive of the determined primitives that is divided and is (2) within the primitive of the determined primitives;
- determining that a set of one or more of the sub-primitives intersect with one or more primitives of the body construct;
- based on the determination that the set of one or more of the sub-primitives intersect with the one or more primitives of the body construct, repeatedly dividing the set of one or more sub-primitives and extending the further divided sub-primitives to be external to the body construct until determined that the further divided sub-primitives do not intersect with the one or more primitives of the body construct; and
- generating graphical information based at least in part on the further divided sub-primitives.

8. The method of claim 7, wherein the set of one or more of the sub-primitives comprises a first set of one or more of the sub-primitives, the method further comprising:
- determining that one or more vertices of a second set of one or more of the sub-primitives are within the body construct; and
- based on the determination that the one or more vertices of the second set of the one or more sub-primitives are within the body construct, extending the one or more vertices to be outside the body construct,
- wherein generating the graphical information comprises generating the graphical information based at least in part on the further divided sub-primitives and the extended one or more vertices.

9. The method of claim 8, wherein extending the one or more vertices comprises:
- determining, for each of the one or more vertices, a respective normal vector, wherein each respective normal vector intersects each respective vertex and is oriented towards the body construct; and
- extending each of the one or more vertices to corresponding points on the body construct based on each respective normal vector.

10. The method of claim 9, wherein determining, for each of the one or more vertices, the respective normal vector comprises:
- determining, for each of the one or more vertices, a respective plane based on interconnections of the one or more vertices and neighboring points; and
- determining the respective normal vector as a vector that is orthogonal to each respective plane.

11. The method of claim 7, further comprising:
- rendering the virtual apparel on the virtual representation of the user based on the graphical information.

12. The method of claim 7, further comprising:
- outputting the graphical information for rendering of the virtual apparel on the virtual representation of the user.

13. The method of claim 7, wherein dividing the determined primitives comprises:
- determining respective vertices along each edge of the determined primitives; and
- generating the sub-primitives based on the determined respective vertices.

14. A device for apparel simulation, the device comprising:
- a memory configured to store a virtual representation of a user; and
- processing circuitry configured to:
  - determine a body construct used for generating a shape of the virtual representation of the user;
  - determine that points on a virtual apparel are within the body construct;
  - determine, for each of the points, a respective normal vector, wherein each respective normal vector intersects each respective point and is oriented towards the body construct;
  - extend each of the points to corresponding points on the body construct based on each respective normal vector;
  - determine primitives of the virtual apparel having the extended points that intersect with primitives of the body construct;

divide the determined primitives of the virtual apparel into sub-primitives, wherein each of the sub-primitives is (1) smaller in size than a primitive of the determined primitives that is divided and is (2) within the primitive of the determined primitives;

determine that a set of one or more of the sub-primitives intersect with one or more primitives of the body construct;

based on the determination that the set of one or more of the sub-primitives intersect with one or more primitives of the body construct, repeatedly divide the second set of one or more sub-primitives and extending the further divided sub-primitives to be external to the body construct until determined that the further divided sub-primitives do not intersect with the one or more primitives of the body construct; and generate graphical information based at least in part on the further divided sub-primitives.

15. The device of claim 14, wherein the set of one or more of the sub-primitives comprises a first set of one or more of the sub-primitives, wherein the processing circuitry is configured to:

determine that one or more vertices of a second set of one or more of the sub-primitives are within the body construct; and based on the determination that the one or more vertices of the second set of the one or more sub-primitives are within the body construct, extending the one or more vertices to be outside the body construct, wherein to generate the graphical information, the processing circuitry is configured to generate the graphical information based at least in part on the further divided sub-primitives and the extended one or more vertices.

16. The device of claim 14, wherein to determine, for each of the points, the respective normal vector, the processing circuitry is configured to:

determine, for each of the points, a respective plane based on interconnections of the one or more points and neighboring points; and determine the respective normal vector as a vector that is orthogonal to each respective plane.

17. The device of claim 14, wherein to determine that points on a virtual apparel are within the body construct, the processing circuitry is configured to determine that vertices of one or more primitives of the virtual apparel are within the body construct.

* * * * *